(12) United States Patent
Kouno

(10) Patent No.: US 8,693,034 B2
(45) Date of Patent: Apr. 8, 2014

(54) IMAGE PROCESSING METHOD, APPARATUS, AND COMPUTER-READABLE STORAGE MEDIUM FOR COMPUTER PROGRAM THAT RETRIEVES A CONDITION INPUT SCREEN

(75) Inventor: Takahiro Kouno, Amagasaki (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 392 days.

(21) Appl. No.: 12/949,522

(22) Filed: Nov. 18, 2010

(65) Prior Publication Data

US 2011/0128574 A1  Jun. 2, 2011

(30) Foreign Application Priority Data

Nov. 27, 2009  (JP) ................................ 2009-269487

(51) Int. Cl.
*G06F 3/12* (2006.01)
*G06K 15/00* (2006.01)

(52) U.S. Cl.
USPC .......................... 358/1.15; 358/1.16; 358/1.14

(58) Field of Classification Search
None
See application file for complete search history.

(56) References Cited

U.S. PATENT DOCUMENTS

| 7,428,068 | B2 | 9/2008 | Kadoi et al. | |
|---|---|---|---|---|
| 2002/0136559 | A1* | 9/2002 | Simpson et al. | 399/9 |
| 2002/0196460 | A1* | 12/2002 | Parry | 358/1.15 |
| 2003/0011812 | A1* | 1/2003 | Sesek et al. | 358/1.15 |
| 2003/0020953 | A1* | 1/2003 | Van Den Tillaart et al. | 358/1.15 |
| 2004/0080778 | A1 | 4/2004 | Ito et al. | |
| 2006/0092453 | A1* | 5/2006 | Okada et al. | 358/1.14 |
| 2006/0176497 | A1* | 8/2006 | Kimura et al. | 358/1.13 |
| 2007/0013934 | A1* | 1/2007 | Hashimoto et al. | 358/1.13 |
| 2007/0109593 | A1* | 5/2007 | Ohta et al. | 358/1.15 |
| 2008/0218788 | A1* | 9/2008 | Mimura | 358/1.15 |
| 2009/0116052 | A1* | 5/2009 | Matsuzawa | 358/1.14 |
| 2010/0265541 | A1* | 10/2010 | Torii | 358/1.15 |

FOREIGN PATENT DOCUMENTS

| JP | 62-15567 | 1/1987 |
|---|---|---|
| JP | 63-53621 | 3/1988 |
| JP | 10-124266 | 5/1998 |
| JP | 2004-139385 | 5/2004 |
| JP | 2004-151769 | 5/2004 |
| JP | 2009-118082 | 5/2009 |

OTHER PUBLICATIONS

Japanese Notification of Reasons for Refusal mailed Nov. 22, 2011, directed to counterpart Japanese Patent Application No. 2009-269487; 6 pages.

* cited by examiner

*Primary Examiner* — Ming Hon
(74) *Attorney, Agent, or Firm* — Morrison & Foerster LLP

(57) ABSTRACT

An image processing apparatus includes a display portion that displays a condition input screen on which a user enters a condition for a process of printing or scanning an image, a control portion that, when first operation is performed, controls a storage portion to store the condition thus entered, a retrieval portion that, if second operation is performed, reads out the condition from the storage portion, a re-display portion that displays again the condition input screen in a state where the condition thus read out is entered, and a process execution portion that, if third operation is performed, executes the process of printing or scanning an image based on a latest condition stored in the storage portion.

7 Claims, 24 Drawing Sheets

FIG. 6

```
┌─────────────────────────────────────────────────────┐
│                                                     │
│      PLEASE ENTER YOUR USER ID AND PASSWORD.        │
│   ─────────────────────────────────────────────     │
│                                                     │
│      USER ID:  [                        ]           │
│                                                     │
│                                                     │
│      PASSWORD: [                        ]           │
│                                                     │
│                                                     │
│                                                     │
│                          [  OK  ]    [ CLEAR ]      │
│                                                     │
└─────────────────────────────────────────────────────┘
                                                    SC0
```

FIG. 8

PLEASE MAKE SETTINGS FOR SCAN CONDITIONS. IF
YOU CONTINUE THE REMAINING SETTINGS, PLEASE
ENTER THE JOB ID OF THE JOB.

SCAN RESOLUTION : ○ 400dpi  ○ 600dpi

SURFACE TO BE SCANNED : ○ ONE SURFACE  ○ BOTH SURFACES

SCAN SIZE : ○ A4  ○ B4  ○ A5

FORMAT : ○ PDF  ○ TIFF  ○ JPEG

[OK]

[STOP]

JOB ID : [          ]   [RETRIEVE]

```
THE REMAINING SETTINGS HAVE BEEN RETRIEVED.
       PLEASE FINISH THE SETTINGS.
```

| | | |
|---|---|---|
| SCAN RESOLUTION : | ○ 400dpi | ⦿ 600dpi |
| SURFACE TO BE SCANNED : | ⦿ ONE SURFACE | ○ BOTH SURFACES |
| SCAN SIZE : | ○ A4   ○ B4   ⦿ A5 | |
| FORMAT : | ○ PDF  ⦿ TIFF  ○ JPEG | OK |
| | | STOP |
| JOB ID : [        ] | | RETRIEVE |

```
PLEASE MAKE SETTINGS FOR PRINT CONDITIONS. IF
YOU CONTINUE THE REMAINING SETTINGS, PLEASE
ENTER THE JOB ID OF THE JOB.
```

| | | |
|---|---|---|
| FINISH : | ○ STAPLE   ○ PUNCH HOLE | |
| SURFACE TO BE PRINTED : | ○ ONE SURFACE   ○ BOTH SURFACES | |
| PAPER SIZE : | ○ A4   ○ B4   ○ A5 | OK |
| COLOR : | ○ COLOR   ○ MONOCHROME | |
| FILE NAME : [▼]   NUMBER OF SETS : [ ] | | STOP |
| JOB ID : [ ] | | RETRIEVE |

| | |
|---|---|
| THE SETTING DETAILS UP TO NOW HAVE BEEN RETRIEVED. PLEASE FINISH THE SETTINGS. | |

FINISH : ⦿ STAPLE    ○ PUNCH HOLE

SURFACE TO BE PRINTED : ○ ONE SURFACE    ⦿ BOTH SURFACES

PAPER SIZE : ○ A4    ⦿ B4    ○ A5

COLOR : ⦿ COLOR    ○ MONOCHROME    [ OK ]

FILE NAME : [report012 ▼]    NUMBER OF SETS : [ 3 ]    [ STOP ]

JOB ID : [ ]    [ RETRIEVE ]

SP2

IMAGE PROCESSING METHOD, APPARATUS, AND COMPUTER-READABLE STORAGE MEDIUM FOR COMPUTER PROGRAM THAT RETRIEVES A CONDITION INPUT SCREEN

This application is based on Japanese patent application No. 2009-269487 filed on Nov. 27, 2009, the contents of which are hereby incorporated by reference.

BACKGROUND OF THE INVENTION

1. Field of the Invention

The present invention relates to an image processing apparatus such as a Multi-Function Peripheral (MFP), and an image processing method necessary for printing or scanning an image, or the like using the image processing apparatus.

2. Description of the Related Art

Image processing apparatuses having a variety of functions, such as copying, PC printing, scanning, faxing, and file server, have recently come into widespread use. Such image processing apparatuses are sometimes called "multifunction devices", "Multi-Function Peripherals (MFPs)", or the like.

A high-resolution display has been provided in such an image processing apparatus. Further, it has become possible to use an application, e.g., a Web browser, in such an image processing apparatus. This contributes to advancements in the User Interface (UI) of an image processing apparatus and improvement in the operability thereof. Thus, the time for a user to use an image processing apparatus will probably increase.

Meanwhile, an image processing apparatus installed in organizations such as offices of business and schools are usually shared by a plurality of users. In such a case, if the time for each user to use the image processing apparatus increases, the following situation is more likely to occur. To be specific, even when a user intends to use the image processing apparatus, he/she cannot use the image processing apparatus because it is being used by another user.

To cope with this, the following methods have been proposed as a method for sharing a device by a plurality of users.

According to the method disclosed in Japanese Laid-open Patent Publication No. 10-124266, a plurality of image forming devices are connected to one another. When an interruption key is pressed in an image forming device functioning as a master machine, the image forming device continues the current printing process until the process for the current set of prints finishes. At a time when the image forming device finishes the current printing process for the set, each of the image forming devices functioning as slave machines is requested to perform the printing process for the remaining sets; thereby to continue the printing process.

According to the method disclosed in Japanese Laid-open Patent Publication No. 2004-139385, each time instructions are given by pressing a save button arranged on an operation panel of a printer, an interruption event transferred from the printer to a PC is detected by the PC. In accordance with the interruption event thus detected, image data in a memory card inserted into a card slot of the printer is controlled to be stored in a hard disk of the PC. Each time instructions are given by pressing a printing start button arranged on the operation panel of the printer, the interruption event transferred from the printer to the PC is detected. In accordance with the interruption event thus detected, printing of image data read out from the memory card and printing of the image data stored in the hard disk of the PC are controlled.

According to the method disclosed in Japanese Laid-open Patent Publication No. 2004-151769, each time instructions are issued from a control panel provided in an external operating device, an interruption event transferred from the external operating device to a host computer is detected. Image data read out from a memory card mountable on the external operating device and print settings are acquired according to the detected interruption event, and a preview display part controls a print preview display where the print settings are reflected on the display unit of the host computer in real time or controls the update display of the print preview display.

As described in these publications, there are proposed control methods for a case where an interruption event is detected while a process is being performed.

Along with the improvement in function of an image processing apparatus as described above, conditions sometimes increase which have to be preset by a user prior to a process. It is accordingly possible that, before a first user uses an image processing apparatus to start a process, i.e., while the first user is making settings for conditions before the process, the first user has to let a second user, who needs to use the image processing apparatus for an urgent process, use the image processing apparatus.

In such a case, after letting the second user use the image processing apparatus, the first user performs work again for setting the conditions when the image processing apparatus becomes available, or alternatively, the first user uses another image processing apparatus to perform the work again for setting the conditions. According to the conventional methods described in Japanese Laid-open Patent Publication Nos. 10-124266, 2004-139385, and 2004-151769, the first user is forced to perform the work again for setting the conditions from the beginning.

SUMMARY

The present disclosure is directed to solve the problems pointed out above, and therefore, an object of an embodiment of the present invention is to, as compared with conventional technologies, improve the user-friendliness for a user who performs work for setting conditions for a process performed in an image processing apparatus shared by a plurality of users.

According to an aspect of the present invention, an image processing apparatus includes a display portion that displays a condition input screen on which a user enters a condition for a process of printing or scanning an image, a control portion that, when first operation is performed, controls a storage portion to store the condition thus entered, a retrieval portion that, if second operation is performed, reads out the condition from the storage portion, a re-display portion that displays again the condition input screen in a state where the condition thus read out is entered, and a process execution portion that, if third operation is performed, executes the process of printing or scanning an image based on a latest condition stored in the storage portion.

Preferably, the storage portion is provided in a server, and the control portion stores the condition in the storage portion by sending the condition to the server.

Further, the storage portion may be a storage medium provided in another image processing apparatus, and the control portion may store the condition in the storage portion by sending the condition to another image processing apparatus equipped with a function to execute the process of printing or scanning an image based on the condition.

Further, the image processing apparatus may further include an informing portion that, if another image processing apparatus stores, in the storage portion, the condition read out by the retrieval portion, and if the process of printing or scanning an image cannot be executed based on the condition, informs the user that the process of printing or scanning an image cannot be executed based on the condition.

These and other characteristics and objects of the present invention will become more apparent by the following descriptions of preferred embodiments with reference to drawings.

BRIEF DESCRIPTION OF THE DRAWINGS

FIG. 6 is a diagram illustrating an example of a log-on screen.

FIG. 8 is a diagram illustrating an example of a scan settings screen.

FIG. 11 is a diagram illustrating an example of a scan settings screen.

FIG. 16 is a diagram illustrating an example of a print settings screen.

FIG. 18 is a diagram illustrating an example of a print settings screen.

DESCRIPTION OF THE PREFERRED EMBODIMENTS

First Embodiment

Figure 1:
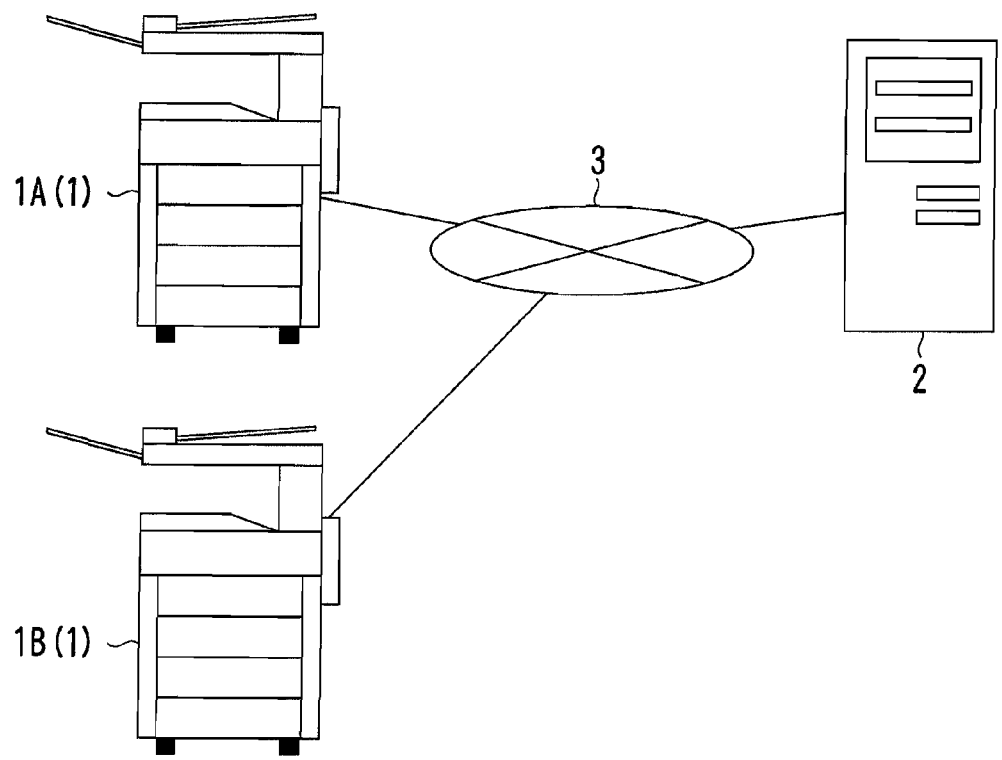
FIG. 1 is a diagram illustrating an example of the overall configuration of a network system.
Figure 2:
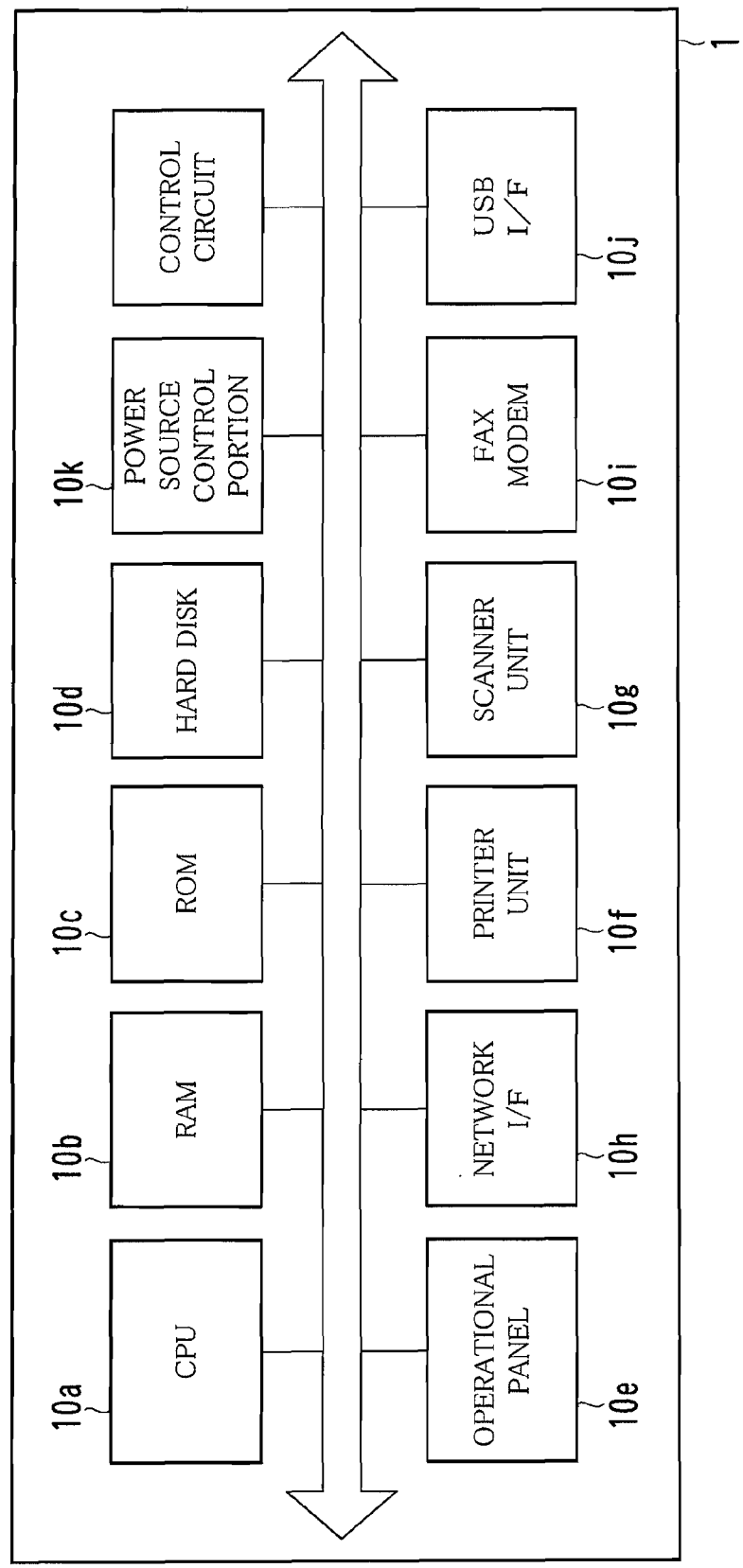
FIG. 2 is a diagram illustrating an example of the hardware configuration of an image forming apparatus.
Figure 3:
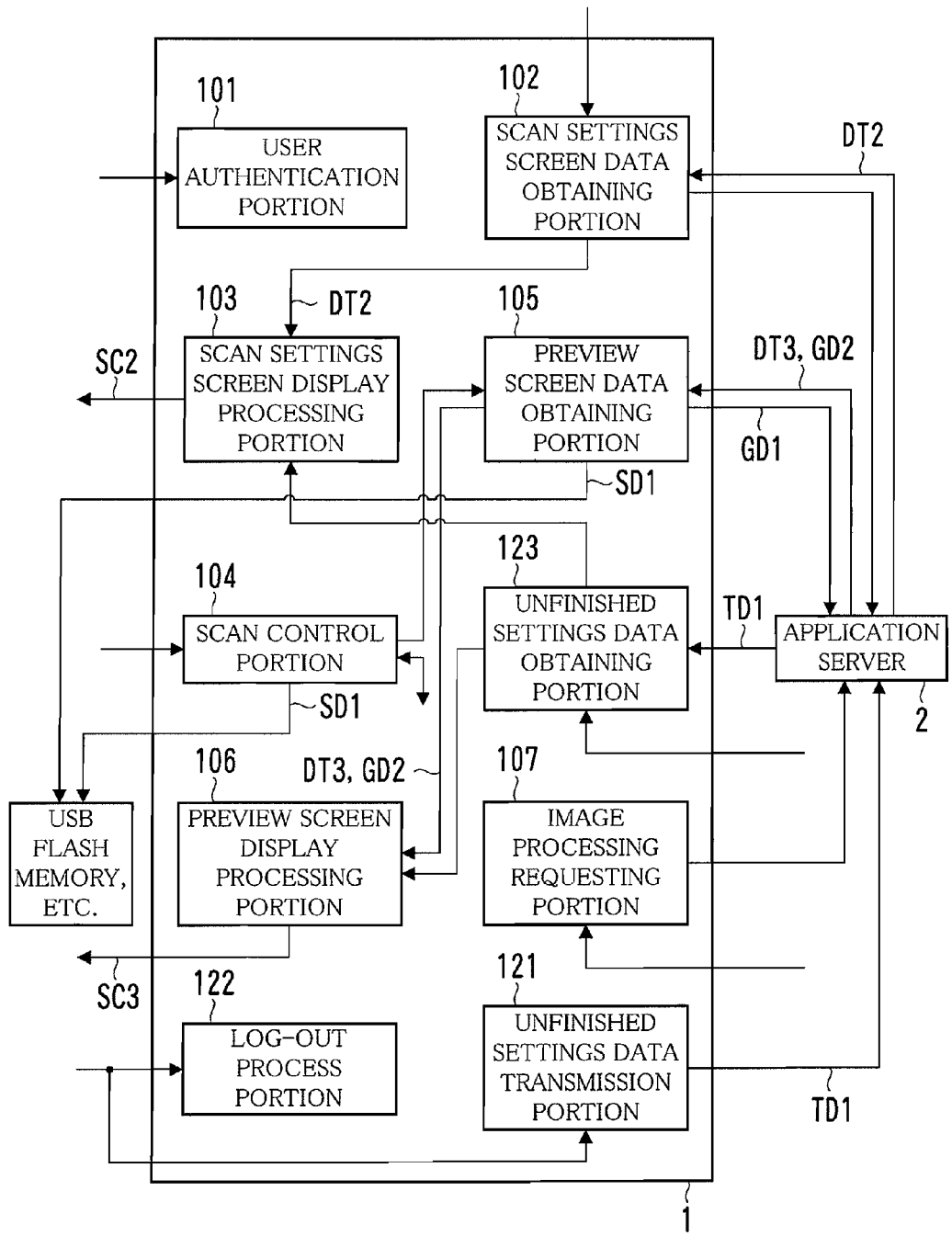
FIG. 3 is a diagram illustrating an example of the functional configuration of an image forming apparatus according to a first embodiment.
Figure 4:
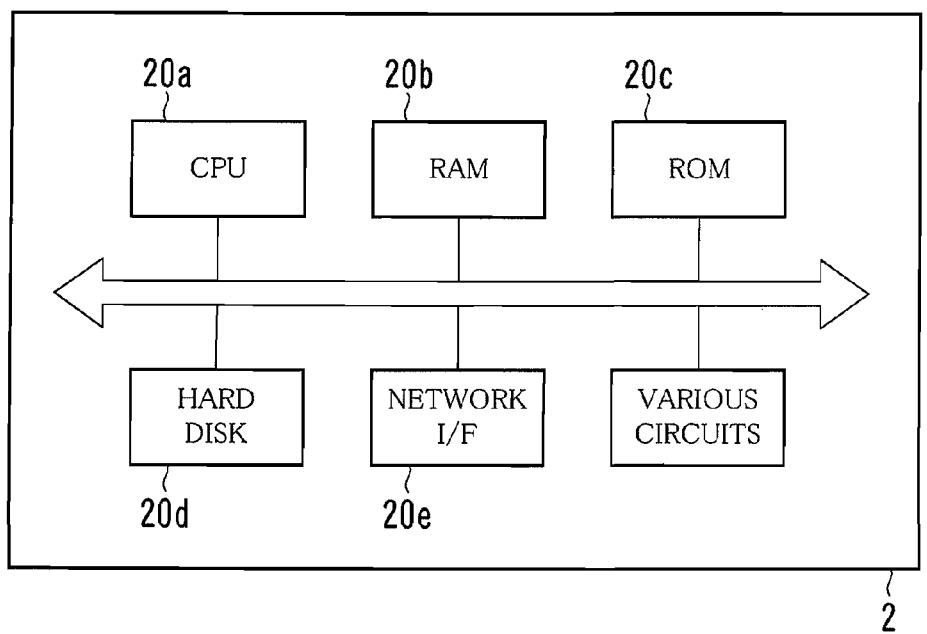
FIG. 4 is a diagram illustrating an example of the hardware configuration of an application server.
Figure 5:
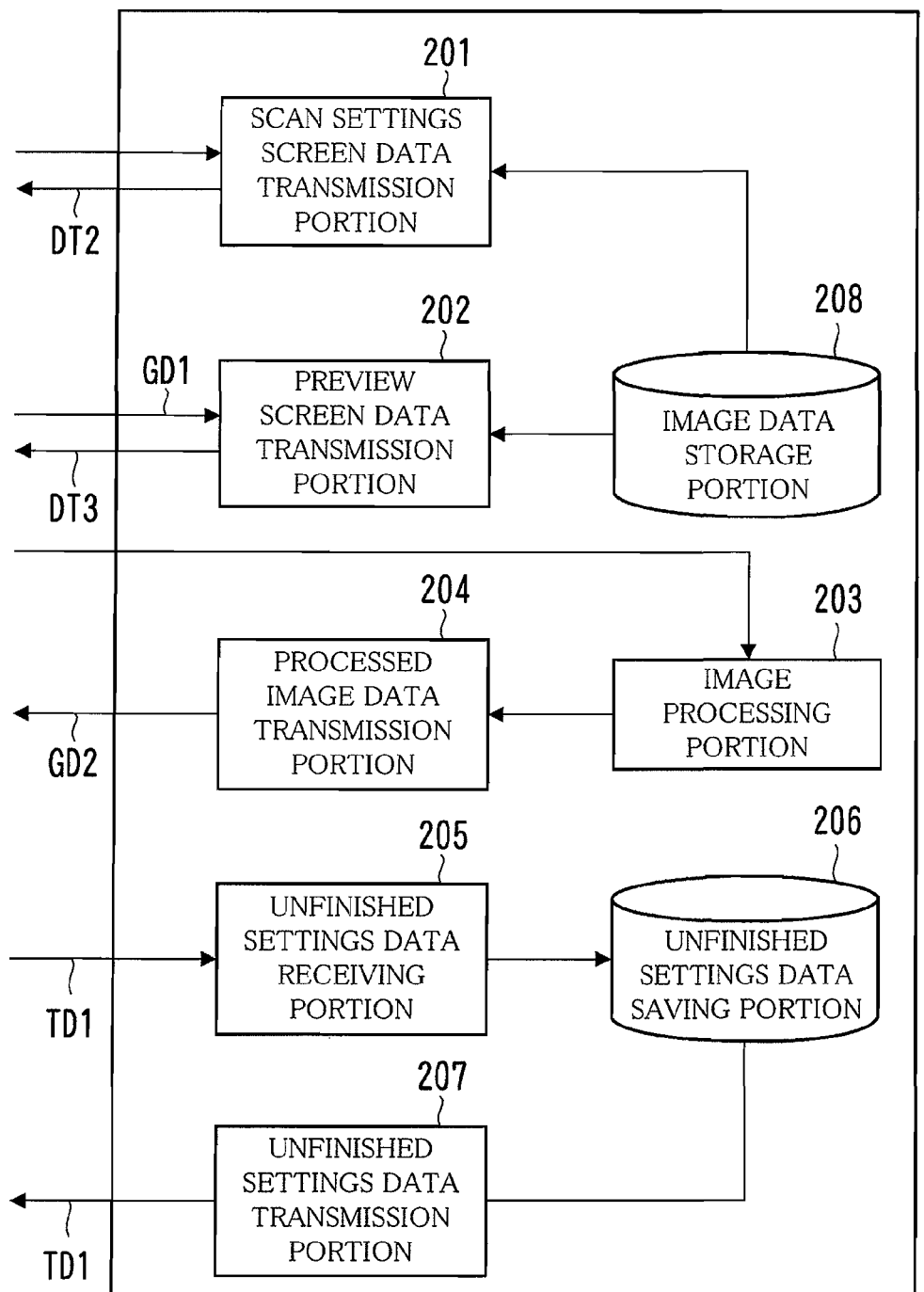
FIG. 5 is a diagram illustrating an example of the functional configuration of an application server according to the first embodiment.

FIG. 1 is a diagram illustrating an example of the overall configuration of a network system NS; FIG. 2 is a diagram illustrating an example of the hardware configuration of an image forming apparatus 1; FIG. 3 is a diagram illustrating an example of the functional configuration of the image forming apparatus 1 according to the first embodiment; FIG. 4 is a diagram illustrating an example of the hardware configuration of an application server 2; and FIG. 5 is a diagram illustrating an example of the functional configuration of the application server 2 according to the first embodiment.

Referring to FIG. 1, the network system NS is configured of a plurality of the image forming apparatuses 1, the application server 2, a communication line 3, and so on. The individual image forming apparatuses 1 transmit data to the application server 2 and vice versa via the communication line 3.

The network system NS is installed in organizations such as business offices or public offices, and is used by members belonging to such an organization. The following is a description of an example in which the network system NS is used in an X-company. An employee of the X-company is hereinafter referred to as a "user". A user is given a unique identification (ID).

The image forming apparatus 1 is an image processing apparatus generally called a multifunction device or a Multi Function Peripheral (MFP). The image forming apparatus 1 is a device that integrates a variety of functions, such as copying, PC printing, faxing, scanning, pull printing, box function, a Web browser function, and so on, into a single unit.

The "box function" is a function in which a storage area called a "box" or the like and corresponding to a folder or a directory in a personal computer is allocated to each user of the image forming apparatus 1, and the user can save data of a document formed of images such as text, photo, illustration, and drawing to his/her own box on a file-by-file basis.

The "PC printing function" is a function to print an image onto paper based on image data received from a personal computer. The PC printing function is sometimes called a "network printer function" or a "network printing function".

The "pull printing function" is a function to print a document image onto paper by obtaining, from another device, data of a document specified by a user.

The image forming apparatus 1 combines these functions appropriately, and executes variety types of jobs. The image forming apparatus 1 also issues a unique job ID to each job in order to distinguish the individual jobs from each other.

Referring to FIG. 2, the image forming apparatus 1 is configured of a Central Processing Unit (CPU) 10a, a Random Access Memory (RAM) 10b, a Read Only Memory (ROM) 10c, a hard disk 10d, an operational panel 10e, a printer unit 10f, a scanner unit 10g, a network interface 10h, a fax modem 10i, a Universal Serial Bus (USB) interface 10j, a power source control portion 10k, various control circuits, and so on.

The operational panel 10e is configured of a display, a plurality of operational buttons, and the like. When an operational button is pressed, a signal indicating the operational button is sent to the CPU 10a. The display serves to display, for example, a screen for giving a message or a command to a user directly operating the image forming apparatus 1, a screen for the user to enter setting details and process details, and a screen for displaying an image formed by the image forming apparatus 1 and the result of a process performed thereby. In this embodiment, a touchscreen is used as the display. The display, therefore, has a function to detect a position thereof touched by the user with his/her finger and send a signal indicating the detection result to the CPU 10a.

The scanner unit 10g is a device that reads a document image depicted on paper, and creates image data thereof. The scanner unit 10g is provided with an Automatic Document Feeder (ADF) and a document tray. The ADF serves to feed each sheet of paper of a document placed on the document tray onto a glass plate of a reading portion of the scanner 10g.

The USB interface 10j is a USB interface board for performing communication with a so-called USB device.

The printer unit 10f serves to print, onto paper, a document image captured by the scanner unit 10g or a document image included in image data received from another device. The printer unit 10f is provided with a paper output tray. Paper onto which a document image has been printed, or, in other words, a printed matter, is outputted to the paper output tray.

The network interface 10h is a Network Interface Card (NIC) for communicating with the application server 2 according to Transmission Control Protocol/Internet Protocol (TCP/IP).

The fax modem 10i is a device to perform communication with another facsimile terminal via a fixed-line telephone network based on a protocol such as Group 3 (G3).

The power source control portion 10k manages power supply to the individual pieces of hardware constituting the image forming apparatus 1.

Referring to FIG. 3, the ROM 10c or the hard disk 10d stores programs and data for implementing functions of a user authentication portion 101, a scan settings screen data obtaining portion 102, a scan settings screen display processing portion 103, a scan control portion 104, a preview screen data obtaining portion 105, a preview screen display processing portion 106, an image processing requesting portion 107, an unfinished settings data transmission portion 121, a log-out process portion 122, an unfinished settings data obtaining portion 123, and the like. These programs are loaded into the RAM 10b as necessary, whereupon the programs are executed by the CPU 10a.

Hereinafter, the individual image forming apparatuses 1 are sometimes distinguished from one another as an "image forming apparatus 1A", an "image forming apparatus 1B", and so on.

The whole or a part of the functions of the individual portions illustrated in FIG. 3 may be implemented merely by hardware such as a circuit.

Referring back to FIG. 1, the application server 2 serves to provide the image forming apparatus 1 with data of screens to be displayed on the display of the image forming apparatus 1, and perform image processing such as an inclination correction and a base correction both of which are described later.

Referring to FIG. 4, the application server 2 is configured of a CPU 20a, a RAM 20b, a ROM 20c, a hard disk 20d, a network interface 20e, and so on.

Referring to FIG. 5, the ROM 20c or the hard disk 20d stores programs and data for implementing functions of a scan settings screen data transmission portion 201, a preview screen data transmission portion 202, an image processing portion 203, a processed image data transmission portion 204, an unfinished settings data receiving portion 205, an unfinished settings data saving portion 206, an unfinished settings data transmission portion 207, an image data storage portion 208, and the like. These programs are loaded into the RAM 20b as necessary, whereupon the programs are executed by the CPU 20a.

A user operates the image forming apparatus 1 to cause the same to execute a scan job, so that a document image depicted on paper can be converted into electronic data. Further, even when the user temporarily stops the operation of the image forming apparatus 1, he/she can resume the operation again later from a point at which the user has suspended the operation instead of starting the operation again from the beginning.

Next, a description is given of the details of processes performed by the individual portions of the image forming apparatus 1 shown in FIG. 3, and by the individual portions of the application server 2 shown in FIG. 5.

[Case where Setting Operations are not Interrupted]

Figure 7:
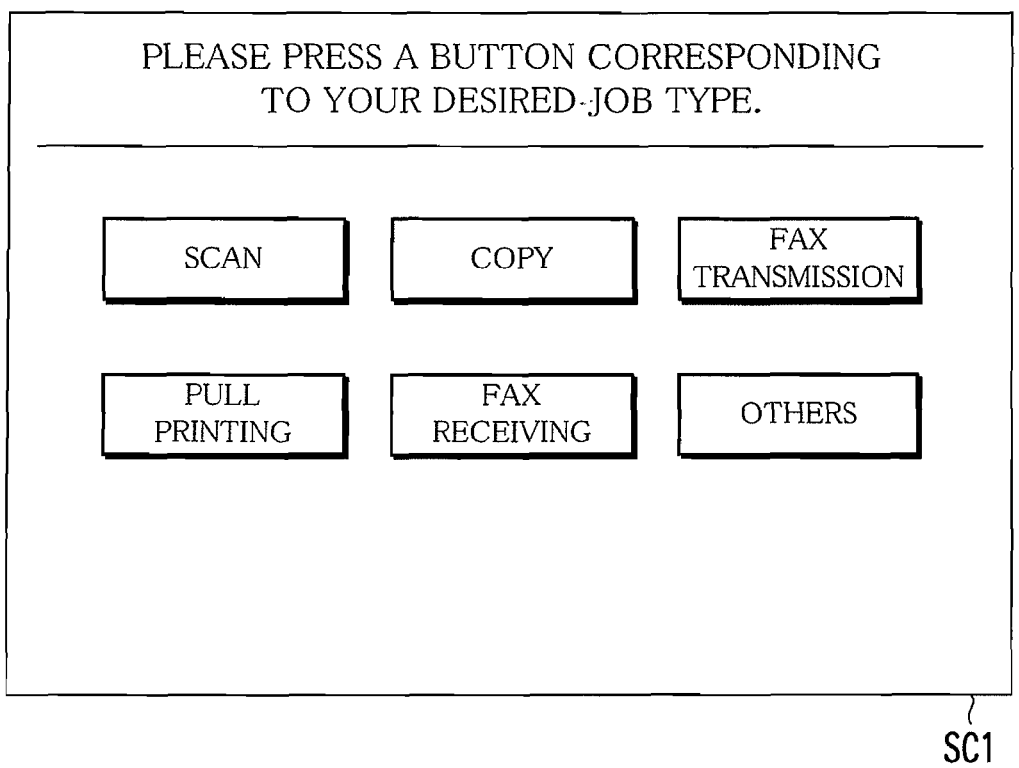
FIG. 7 is a diagram illustrating an example of a job selection screen.
Figure 9:
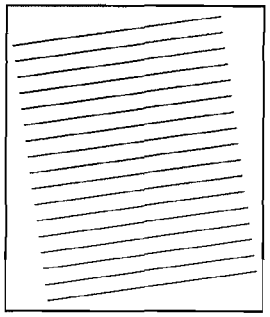
FIG. 9 is a diagram illustrating an example of a preview screen.
Figure 10:
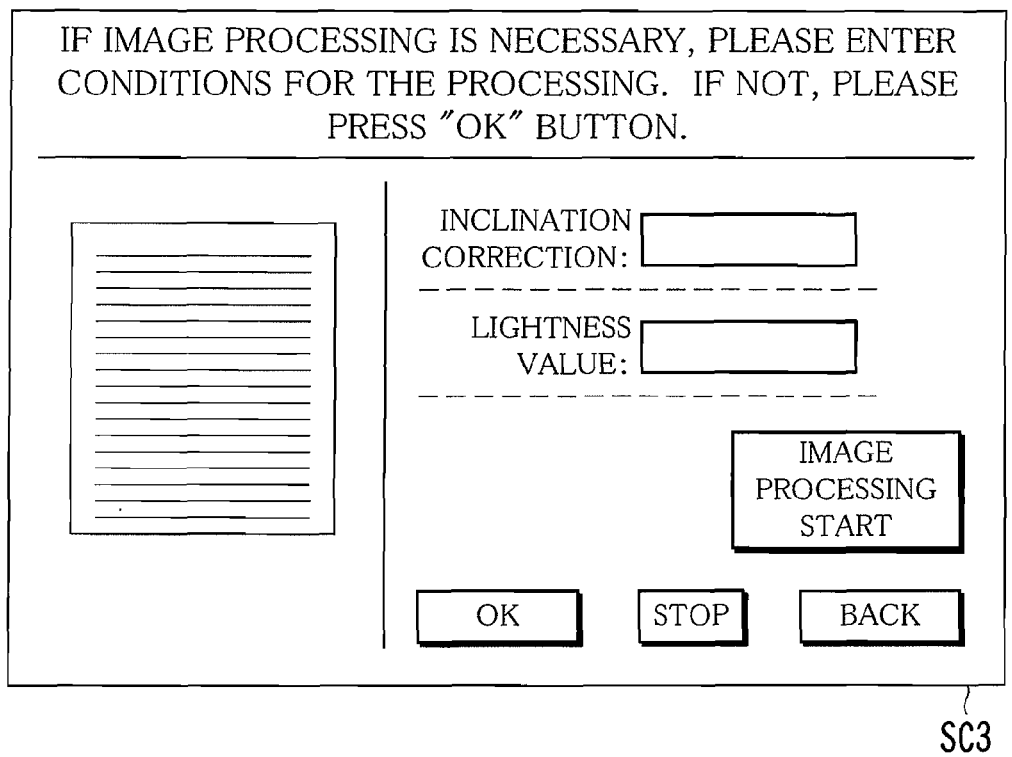
FIG. 10 is a diagram illustrating an example of a preview screen.

FIG. 6 is a diagram illustrating an example of a log-on screen SC0; FIG. 7 is a diagram illustrating an example of a job selection screen SC1; FIG. 8 is a diagram illustrating an example of a scan settings screen SC2; FIG. 9 is a diagram illustrating an example of a preview screen SC3; and FIG. 10 is a diagram illustrating an example of the preview screen SC3.

Referring to FIG. 5, the image data storage portion 208 of the application server 2 stores, therein, in advance, data for displaying the screens described later, e.g., scan settings screen data DT2. Each piece of the data is described in a format corresponding to the Web browser, for example, in a Hypertext Markup Language (HTML). Further, the data sometimes includes Graphics Interchange Format (GIF) image data or Joint Photographic Experts Group (JPEG) image data.

Referring to FIG. 3, the user authentication portion 101 of the image forming apparatus 1 performs a process for determining whether or not a user who is to use the image forming apparatus 1 is an authorized user in the following manner.

The user authentication portion 101 is provided with a database in which user IDs and passwords are stored in advance on a user-by-user basis.

When nobody uses the image forming apparatus 1, the log-on screen SC0 as shown in FIG. 6 is displayed as a so-called standby screen on the operational panel 10e. A user who intends to use the image forming apparatus 1 enters his/her user ID and password on the log-on screen SC0.

Responding to this operation, the user authentication portion 101 checks whether or not the user ID and password entered by the user matches any of user IDs and passwords stored in the database. If it is found that the entered user ID and password matches a user ID and a password stored in the database, then the user authentication portion 101 determines that the user is an authorized user.

If the user is authenticated, then he/she is allowed to log onto the image forming apparatus 1 and to use the same. After the user logs onto the image forming apparatus 1, the job selection screen SC1 is displayed on the operational panel 10e as shown in FIG. 7. The user presses a "SCAN" button on the job selection screen SC1.

In response to the "SCAN" button being pressed, the scan settings screen data obtaining portion 102 obtains the scan settings screen data DT2 for displaying the scan settings screen SC2 shown in FIG. 8 from the application server 2 in the following manner.

The scan settings screen data obtaining portion 102 accesses the application server 2, and requests the scan settings screen data DT2 from the application server 2.

Upon receiving the request, the scan settings screen data transmission portion 201 of the application server 2 sends the scan settings screen data DT2 to the image forming apparatus 1.

Subsequently, the scan settings screen data obtaining portion 102 obtains the scan settings screen data DT2 sent from the application server 2.

The scan settings screen display processing portion 103 displays the scan settings screen SC2 on the operational panel 10e based on the scan settings screen data DT2 obtained from the application server 2. As shown in FIG. 8, radio buttons with which conditions of various items for a scan process are set are provided on the scan settings screen SC2.

A "SCAN RESOLUTION" is a condition to determine a resolution for scanning a document image depicted on paper. A "SURFACE TO BE SCANNED" is a condition to determine whether a single surface or both surfaces of paper are to be scanned. A "SCAN SIZE" is a condition to determine a paper size. A "FORMAT" is a condition to determine a format to be used for making a file from raw data of a scanned document image.

The user places paper carrying a document image to be scanned on the ADF of the scanner unit 10g, enters scan conditions on the scan settings screen SC2, and presses an "OK" button. Thereby, settings for scan conditions are made.

The scan settings screen display processing portion 103 is realized by the Web browser provided in the image forming apparatus 1. The same is similarly applied to the preview screen display processing portion 106, a print settings screen display processing portion 133, and a preview screen display processing portion 136 each of which is described later.

The scan control portion 104 controls the scanner unit 10g to perform a process for scanning the document image depicted on paper based on the conditions set by the user; thereby to generate image data GD1.

The preview screen data obtaining portion 105 obtains preview screen data DT3 for displaying the preview screen SC3 shown in FIG. 9 from the application server 2 in the following manner.

The preview screen data obtaining portion 105 accesses the application server 2, and requests the preview screen data DT3 therefrom. At this time, the preview screen data obtaining portion 105 sends, to the application server 2, the image data GD1 generated by the scan control portion 104.

Responding to the request, the preview screen data transmission portion 202 of the application server 2 generates preview screen data DT3 and sends the generated preview screen data DT3 to the image forming apparatus 1. Referring to FIG. 9, the preview screen SC3 is formed of a part corresponding to the document image captured by the image forming apparatus 1, and a part including text boxes for image processing settings described later and a variety of buttons. The image data GD1 sent from the image forming apparatus 1 is used as data for displaying the former part. Preview screen data prepared in the image data storage portion 208 is used as data for displaying the latter part.

The preview screen data obtaining portion 105 obtains the preview screen data DT3 sent from the application server 2.

The preview screen display processing portion 106 displays the preview screen SC3 on the operational panel 10e based on the preview screen data DT3 obtained from the application server 2. As shown in FIG. 9, a document image captured by the scanner unit 10g, option buttons with which image processing to be performed by the application server 2 is set, and so on are provided on the preview screen SC3.

The user looks at the preview screen SC3 displayed, and confirms whether or not the document image has been captured properly. If there is no problem with the captured document image, then the user presses an "OK" button. Responding to this operation, the image data GD1 is saved, as scan data SD1, in a predetermined storage location, e.g., a predetermined box or a USB flash memory inserted into the USB interface 10j.

On the other hand, if there is a problem with the captured document image, the application server 2 is caused to perform image processing, so that corrections can be made to the captured document image.

In the case where, for example, the captured document image is inclined, the user enters the inclination angle into an "INCLINATION CORRECTION" text box. Alternatively, in the case where the captured document image has lightness higher than that the user has expected, the user enters a minus figure for defining the amount to reduce the value of the lightness into a "LIGHTNESS VALUE" text box. In the case where the captured document image has lightness lower than that the user has expected, the user enters a plus figure for defining the amount to increase the value of the lightness into the "LIGHTNESS VALUE" text box. The user, then, presses an "IMAGE PROCESSING START" button.

Responding to this operation, the image processing requesting portion 107 requests the application server 2 to perform the image processing on the captured document image. At this time, the image processing requesting portion 107 conveys the conditions entered by the user to the application server 2.

With the application server 2, the image processing portion 203 receives the request from the image forming apparatus 1 and performs the image processing on the captured document image in accordance with the conditions received from the image forming apparatus 1. To be specific, the image processing portion 203 updates the image data GD1 corresponding to the captured document image in accordance with the received conditions. The image data GD1 resulting from the update is hereinafter referred to as "image data GD2".

The processed image data transmission portion 204 sends, to the image forming apparatus 1, the image data GD2 obtained by the image processing portion 203.

With the image forming apparatus 1, the preview screen display processing portion 106 uses the image data GD2 received from the application server 2 to replace the part corresponding to the captured document image, i.e., the preview image, with a document image that has been subjected to the image processing, so that the preview screen SC3 is displayed as shown in FIG. 10.

In this manner, the user operates the image forming apparatus 1 to make corrections to the captured document image. If appropriate corrections have been made to the captured document image, then the user presses an "OK" button. Then, the image data GD2 is saved to a predetermined storage location as the scan data SD1.

As discussed above, the document image depicted on paper is scanned based on the details specified by the user, and image processing is performed on the captured document image if necessary, so that the scan data SD1 is obtained.

[Case where Setting Operations are Interrupted]

FIG. 11 is a diagram illustrating an example of the scan settings screen SC2.

As described above, when using an image forming apparatus 1 to convert a document into electronic data, a user performs work for setting scan conditions, and further setting image processing conditions if necessary.

In the meantime, it is sometimes a case where, while the user performs the settings work, another user has to urgently use the same image forming apparatus 1 as that used by the user. Alternatively, it is possible that, during the settings work, the user has to go to a different place. In such cases, the user can temporarily stop the work and resume the work again later as described below. It is also possible for the user to use another image forming apparatus 1 to resume the work again.

Descriptions are provided below of processes performed by the individual portions of the image forming apparatus 1 shown in FIG. 3 and the application server 2 shown in FIG. 5, taking an example in which a user Ux uses the image forming apparatus 1A to start work, temporarily stops the work before completing the work, and resumes the work again by using the image forming apparatus 1B. Descriptions of processes and operation that are the same as those in the case where operations are not interrupted are omitted because the descriptions are already provided earlier.

As with the case where operations are not interrupted, the user Ux enters scan conditions on the scan settings screen SC2. The user Ux further enters image processing conditions, if necessary, on the preview screen SC3.

If the user Ux is forced to stop the work temporarily before completely entering the conditions, then he/she presses a "STOP" button on the scan settings screen SC2 or the preview screen SC3.

With the image forming apparatus 1A, the unfinished settings data transmission portion 121 generates unfinished settings data TD1 indicating scan conditions, image processing conditions, the user ID of the user Ux, and a job ID of a job to be executed this time, all of which are entered during a period from when the user Ux logs onto the image forming apparatus 1A to when the user Ux presses the "STOP" button. A part of the unfinished settings data TD1 corresponding to the scan conditions and the image processing conditions is encrypted. The unfinished settings data transmission portion 121, then, sends the unfinished settings data TD1 to the application server 2.

With the application server 2, the unfinished settings data receiving portion 205 receives the unfinished settings data TD1 from the image forming apparatus 1A. The unfinished settings data saving portion 206 saves, thereto, the unfinished settings data TD1 received.

With the image forming apparatus 1A, if the user presses the "STOP" button, then the log-out process portion 122 lets the user Ux log out from the image forming apparatus 1A, and displays the job ID of the job on the operational panel 10e. After the user Ux logs out, another user enters his/her own user ID and password into the image forming apparatus 1A. If the user ID and password entered are verified, then the user is allowed to use the image forming apparatus 1A. As for the user Ux, if the user Ux enters again his/her own user ID and password, and if the user ID and password entered are verified, then the user Ux is allowed to use again the image forming apparatus 1A.

The user Ux memorizes the job ID displayed on the operational panel 10e, takes the paper on which the document image is depicted, and goes to the site of the image forming apparatus 1B. The user Ux, then, enters his/her user ID and password into the image forming apparatus 1B and logs thereonto.

With the image forming apparatus 1B, a user authentication portion 101 performs an authentication process on the user Ux based on the user ID and password entered by the user Ux and the database, and allows the user Ux to log onto the image forming apparatus 1B according to the procedure discussed earlier. A scan settings screen data obtaining portion 102 receives the scan settings screen data DT2 from the application server 2, and a scan settings screen display processing portion 103 displays the scan settings screen SC2 (see FIG. 8).

The user Ux enters the job ID displayed on the operational panel 10e of the image forming apparatus 1A in the "JOB ID" text box on the scan settings screen SC2, and presses a "RETRIEVE" button.

In response to the "RETRIEVE" button being pressed, the unfinished settings data obtaining portion 123 obtains the unfinished settings data TD1 from the application server 2 as follows.

The unfinished settings data obtaining portion 123 accesses the application server 2, and requests the unfinished settings data TD1 therefrom. At this time, the unfinished settings data obtaining portion 123 informs the application server 2 of the user ID of the user Ux and the job ID entered by the user Ux.

Upon receiving the request, the unfinished settings data transmission portion 207 of the application server 2 searches in the unfinished settings data saving portion 206 for unfinished settings data TD1 containing the user ID and job ID received from the unfinished settings data obtaining portion 123 of the image forming apparatus 1B. The unfinished settings data transmission portion 207, then, sends the unfinished settings data TD1 found by the search to the image forming apparatus 1B.

The unfinished settings data obtaining portion 123 obtains the unfinished settings data TD1 sent from the application server 2, and decrypts the encrypted part of the unfinished settings data TD1.

Note that the encryption and the decryption are preferably performed based on the common key cryptography. It is desirable that the identical secret key be used in all the image forming apparatuses 1 included in the network system NS. This limits the use of the unfinished settings data TD1 only within the network system NS.

The scan settings screen display processing portion 103 displays the scan settings screen SC2 as shown in FIG. 11 in such a manner that the setting details indicated in the obtained unfinished settings data TD1 are reflected, i.e., that radio buttons are selected in accordance with the setting details.

After the unfinished settings data TD1 is obtained, the preview screen display processing portion 106 displays the preview screen SC3 with the setting details of the unfinished settings data TD1 reflected.

As described above, the user Ux enters the job ID, and thereby can cause the image forming apparatus 1B to reproduce the state of the work that has been performed in the image forming apparatus 1A. In addition, the user Ux can continue the remaining part of the work that has been performed in the image forming apparatus 1A instead of performing the work again from the beginning.

Thereafter, the individual portions of the image forming apparatus 1 and the application server 2 scan a document image on paper, perform image processing on the captured document image, and so on in accordance with the conditions modified appropriately, i.e., the latest conditions specified by the user Ux; thereby to generate document image data desired by the user Ux. The generated image data is then outputted to a USB flash memory or the like.

Figure 12:
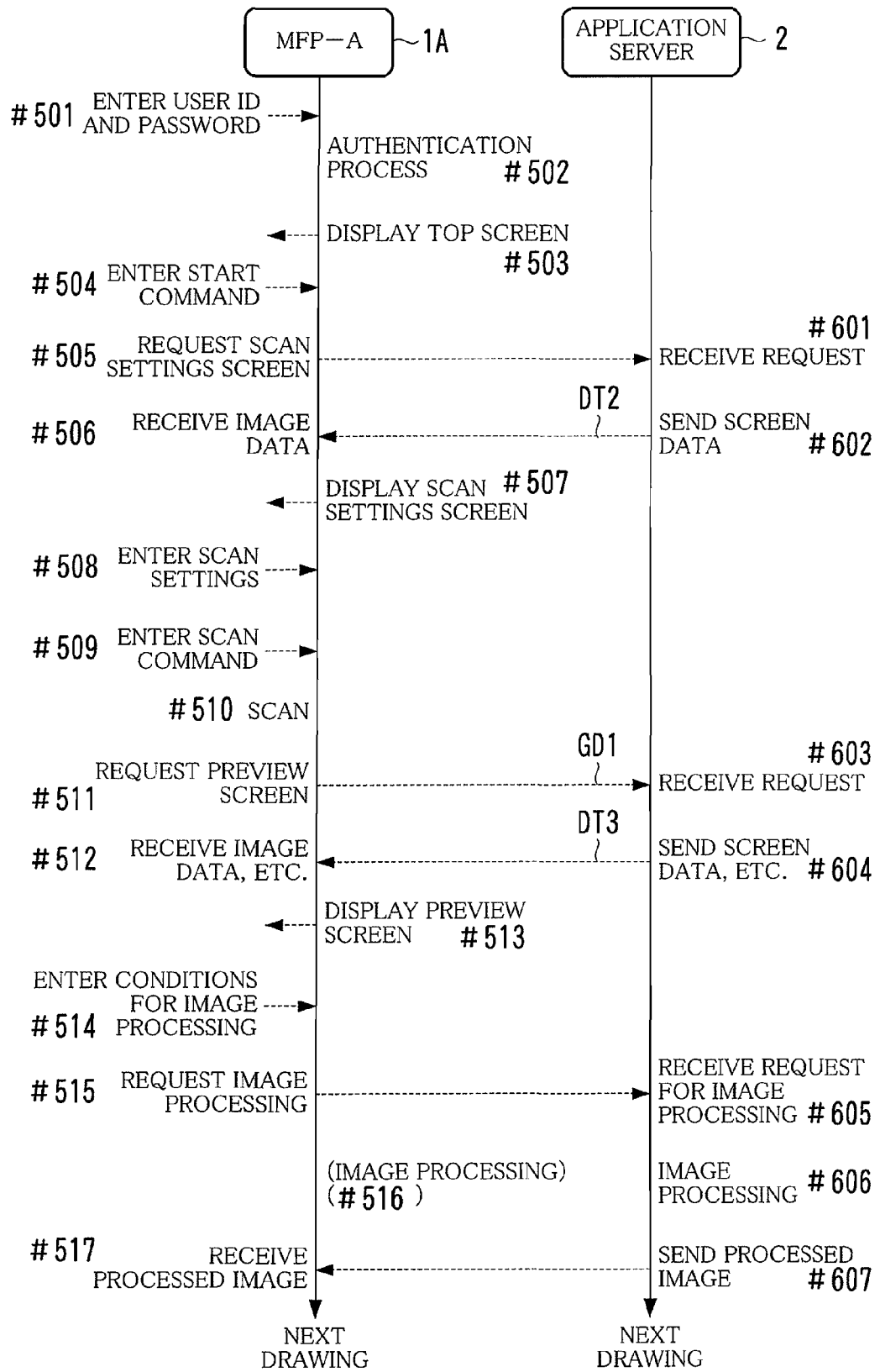
FIG. 12 is a flowchart depicting an example of the overall processing flow of an image forming apparatus and an application server according to the first embodiment.
Figure 13:
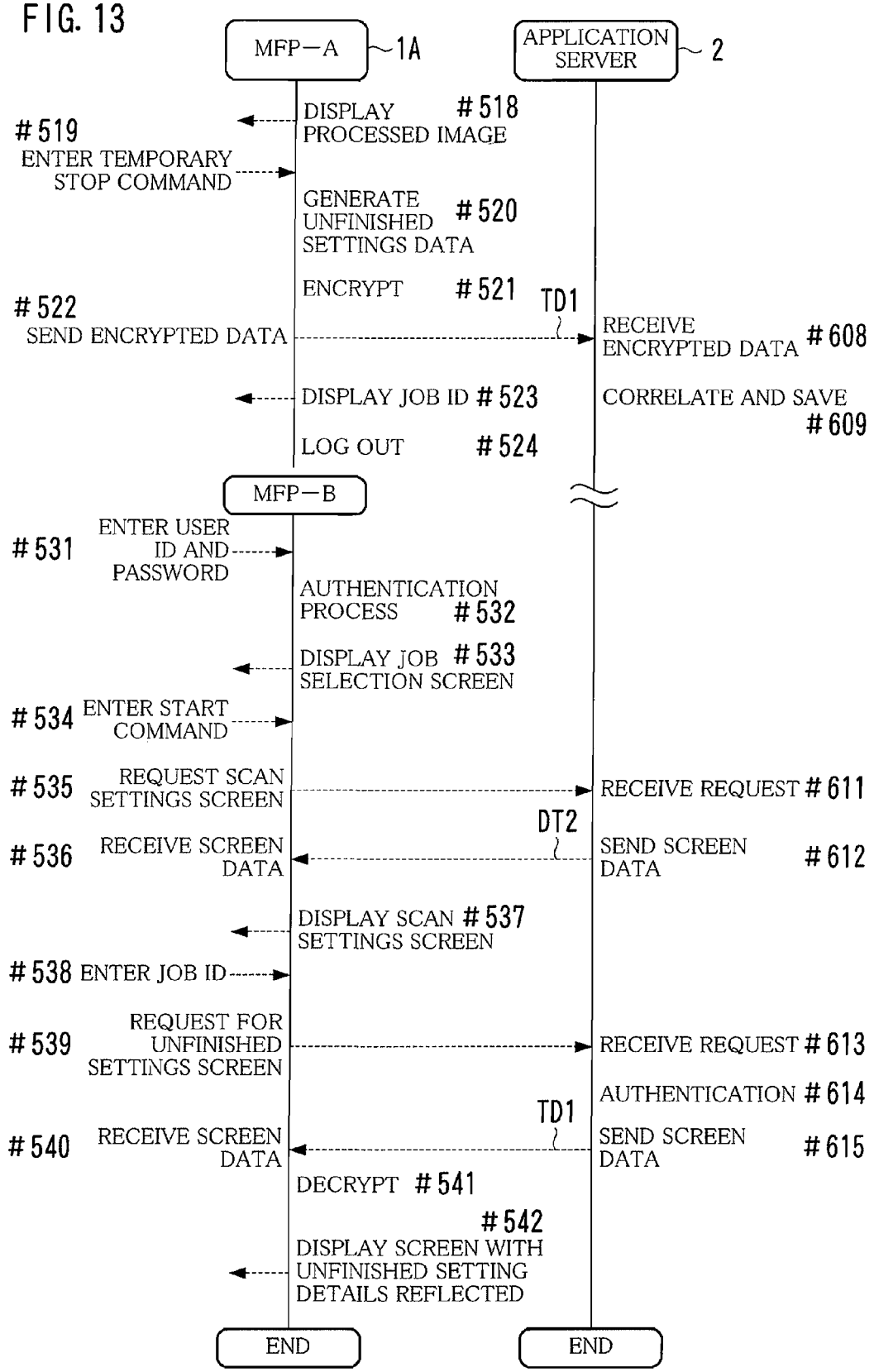
FIG. 13 is a flowchart depicting an example of the overall processing flow of image forming apparatuses and an application server according to the first embodiment.

FIGS. 12 and 13 are flowcharts depicting an example of the overall processing flow of the image forming apparatuses 1A and 1B and the application server 2 according to the first embodiment.

Descriptions are provided below, with reference to the flowcharts of FIGS. 12 and 13, of the overall processing flow of the image forming apparatuses 1A and 1B and the application server 2, taking an example in which the user Ux uses the image forming apparatuses 1A and 1B to convert a document image depicted on paper into electronic data.

The user Ux causes the image forming apparatus 1A to display the log-on screen SC0 (see FIG. 6) and enters his/her user ID and password into the image forming apparatus 1A.

When the user ID and password are entered (#501 of FIG. 12), the image forming apparatus 1A performs an authentication process on the user Ux (#502). If it is verified that the user Ux is an authorized user, then the image forming apparatus 1A allows the user Ux to log thereonto, and displays the job selection screen SC1 (FIG. 7) (#503). The user Ux, then, places the paper on which the document image is depicted on the ADF.

When the user Ux presses the "SCAN" button to give a command to start the scan function (#504), the image forming apparatus 1A requests scan settings screen data DT2 from the application server 2 (#505).

Upon receiving the request (#601), the application server 2 sends the scan settings screen data DT2 to the image forming apparatus 1A (#602).

When receiving the scan settings screen data DT2 (#506), the image forming apparatus 1A displays the scan settings screen SC2 (see FIG. 8) (#507).

The user Ux enters scan conditions on the scan settings screen SC2 (#508), and presses the "OK" button; thereby to give a command to start the scan process (#509).

Responding to the command, the image forming apparatus 1A scans the document image depicted on paper based on the conditions entered by the user Ux, and generates image data GD1 (#510). The image forming apparatus 1A, then, requests preview screen data DT3 from the application server 2 (#511). At this time, the image forming apparatus 1A sends the image data GD1 to the application server 2.

Upon receiving the request (#603), the application server 2 uses the received image data GD1, and so on, generates preview screen data DT3 of the document image captured by the image forming apparatus 1A, and sends the generated preview screen data DT3 to the image forming apparatus 1A (#604).

The image forming apparatus 1A receives the preview screen data DT3 (#512) and displays the preview screen SC3 (see FIG. 9) (#513).

The user Ux views the preview screen SC3 and confirms whether or not the document image has been captured according to his/her desire. The user Ux, then, enters conditions for image processing to be performed by the application server 2 if necessary, and presses the "IMAGE PROCESSING START" button (#514). In the case where, for example, the captured document image is inclined at about 10 degrees, the user Ux enters "10" into the "INCLINATION CORRECTION" text box.

When the user Ux enters the conditions completely, the image forming apparatus 1A requests the application server 2 to perform the image processing (#515). At this time, the image forming apparatus 1A conveys the entered conditions to the application server 2.

When receiving the request (#605), the application server 2 performs the image processing on the captured document image in accordance with the conditions received from the image forming apparatus 1A (#606). This updates the image data GD1 received on Step #603, and as a result, image data GD2 is generated. The application server 2, then, sends the image data GD2 to the image forming apparatus 1A (#607).

If the image forming apparatus 1A itself is capable of performing the image processing based on the conditions, then it is possible for the image forming apparatus 1A rather than the application server 2 to perform the image processing (#516).

Upon receiving the image data GD2 (#517), the image forming apparatus 1A displays, based on the received image data GD2, the preview screen SC3 in which the document image that has undergone the image processing is reflected as shown in FIG. 10 (#518 of FIG. 13).

If the user Ux intends to perform further image processing on the document image, then the user Ux preferably specifies conditions again on the preview screen SC3. Alternatively, in order to change the conditions and perform the scan process again, the user Ux preferably presses a "BACK" button to display the scan settings screen SC2 again. When the "BACK" button is pressed, the image forming apparatus 1A displays again the scan settings screen SC2 in such a manner that the conditions specified the last time are reflected.

Suppose that, although the user Ux intends to use the image forming apparatus 1A to perform the image processing or the scan process again, another user comes to the site of the image forming apparatus 1A, and asks the user Ux to let him/her use the image forming apparatus 1A. Suppose further that the user Ux has decided to use the image forming apparatus 1B to continue the remaining part of the work for the image processing or the scan process.

When the user Ux presses the "STOP" button (#519), the image forming apparatus 1A generates (#520) unfinished settings data TD1 indicating scan conditions, image processing conditions, the user ID of the user Ux, and a job ID of a job to be executed this time, all of which are entered during a period from when the user Ux logs onto the image forming apparatus 1A to when the user Ux presses the "STOP" button. The image forming apparatus 1A further encrypts a part corresponding to the scan conditions and the image processing conditions of the unfinished settings data TD1 (#521). The image forming apparatus 1A then sends, to the application server 2, the unfinished settings data TD1 with the part encrypted (#522).

The image forming apparatus 1A displays the job ID of the job to be executed this time (#523) in parallel with the process for generating and sending the unfinished settings data TD1 or before or after that process. The image forming apparatus 1A lets the user UX log out therefrom (#524).

When receiving the unfinished settings data TD1 (#608), the application server 2 saves the unfinished settings data TD1 as-is, more specifically, saves the unfinished settings data TD1 with the scan conditions and the image processing conditions correlated with the user ID and the job ID (#609).

The user Ux memorizes the displayed job ID, takes the paper on which the document image is depicted, and goes to the site of the image forming apparatus 1B. The user Ux, then, enters his/her user ID and password into the image forming apparatus 1B (#531).

Responding to this operation, the image forming apparatus 1B performs an authentication process on the user Ux (#532). If it is verified that the user Ux is an authorized user, then the image forming apparatus 1B allows the user Ux to log thereonto, and displays the job selection screen SC1 (FIG. 7) (#533). The user Ux places the paper on which the document image is depicted on the ADF.

When the user Ux presses the "SCAN" button to give a command to start the scan function (#534), the image forming apparatus 1B requests scan settings screen data DT2 from the application server (#535).

Upon receiving the request (#611), the application server 2 sends the scan settings screen data DT2 to the image forming apparatus 1B (#612).

When receiving the scan settings screen data DT2 (#536), the image forming apparatus 1B displays the scan settings screen SC2 (see FIG. 8) (#537).

The user Ux, then, enters the job ID displayed by the image forming apparatus 1A into the image forming apparatus 1B (#538).

The image forming apparatus 1B, then, requests unfinished settings data TD1 from the application server 2 (#539). At this time, the image forming apparatus 1B conveys the user ID of the user Ux and the entered job ID to the application server 2.

Upon receiving the request (#613), the application server 2 performs an authentication process based on the user ID and the job ID received (#614). To be more specific, the application server 2 determines whether the request is allowable by checking whether or not unfinished settings data TD1 indicating the user ID and the job ID is saved in the unfinished settings data saving portion 206. If the unfinished settings data TD1 indicating the user ID and the job ID is found, then the application server 2 determines that the request is allowable, and therefore, sends the unfinished settings data TD1 thus found to the image forming apparatus 1B (#615).

Upon receiving the unfinished settings data TD1 (#540), the image forming apparatus 1B decrypts the encrypted part (#541). The image forming apparatus 1B, then, displays again the scan settings screen SC2 with the setting details of the unfinished settings data TD1 reflected as shown in FIG. 11 (#542). Note that, when the preview screen SC3 is displayed later, the setting details of the unfinished settings data TD1 are reflected therein.

Thereby, the user Ux can use the image forming apparatus 1B to continue the remaining part of the work that has been performed using the image forming apparatus 1A.

In the first embodiment, the scan data SD1 is stored in a USB flash memory, and so on. Instead, however, the scan data SD may be transferred to another device via the communication line 3. In such a case, it is preferable to set, as a part of the conditions, a transmission destination of the scan data SD1 and a protocol used for the transmission.

Second Embodiment

Figure 14:
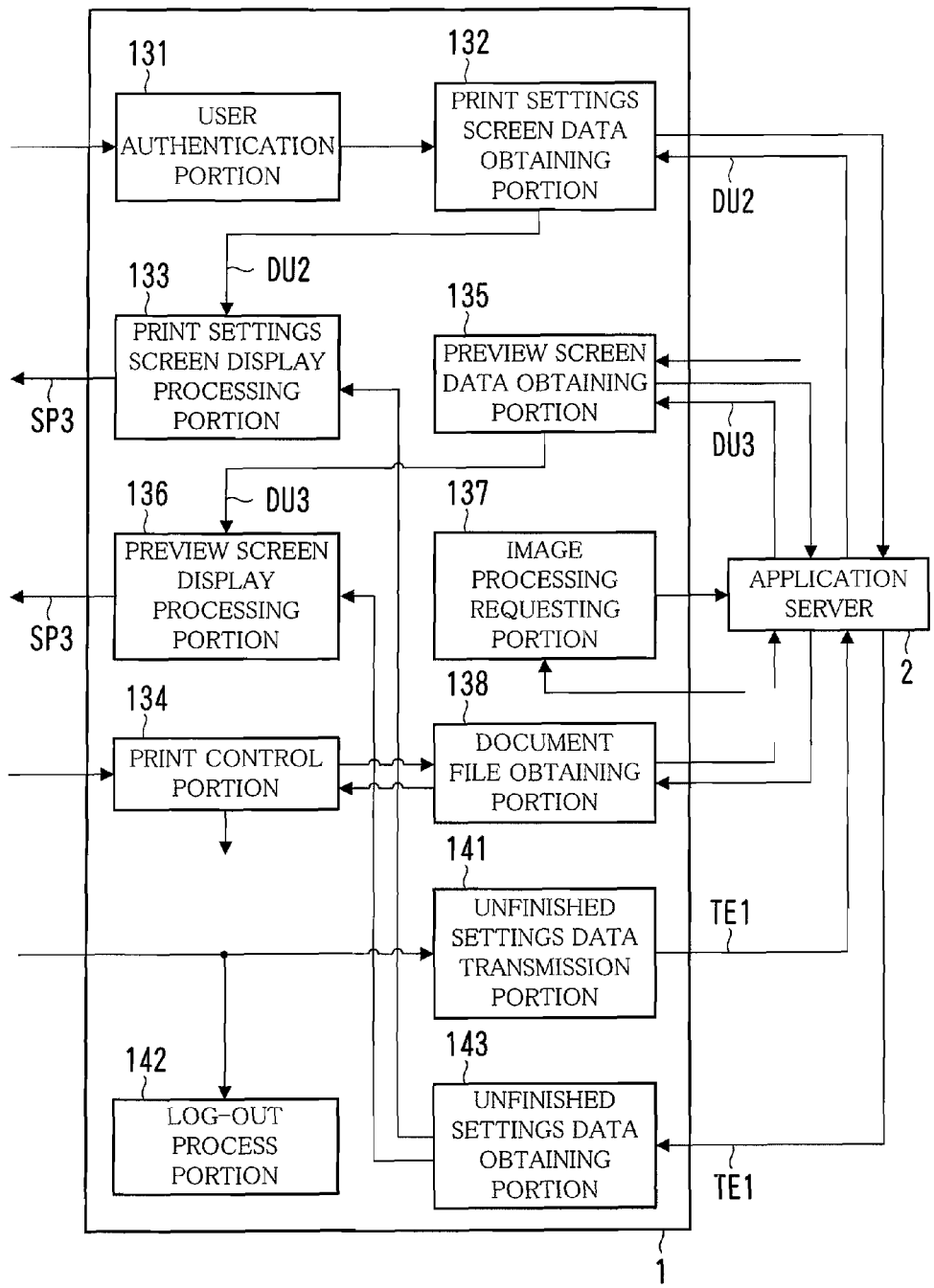
FIG. 14 is a diagram illustrating an example of the functional configuration of an image forming apparatus according to a second embodiment.
Figure 15:
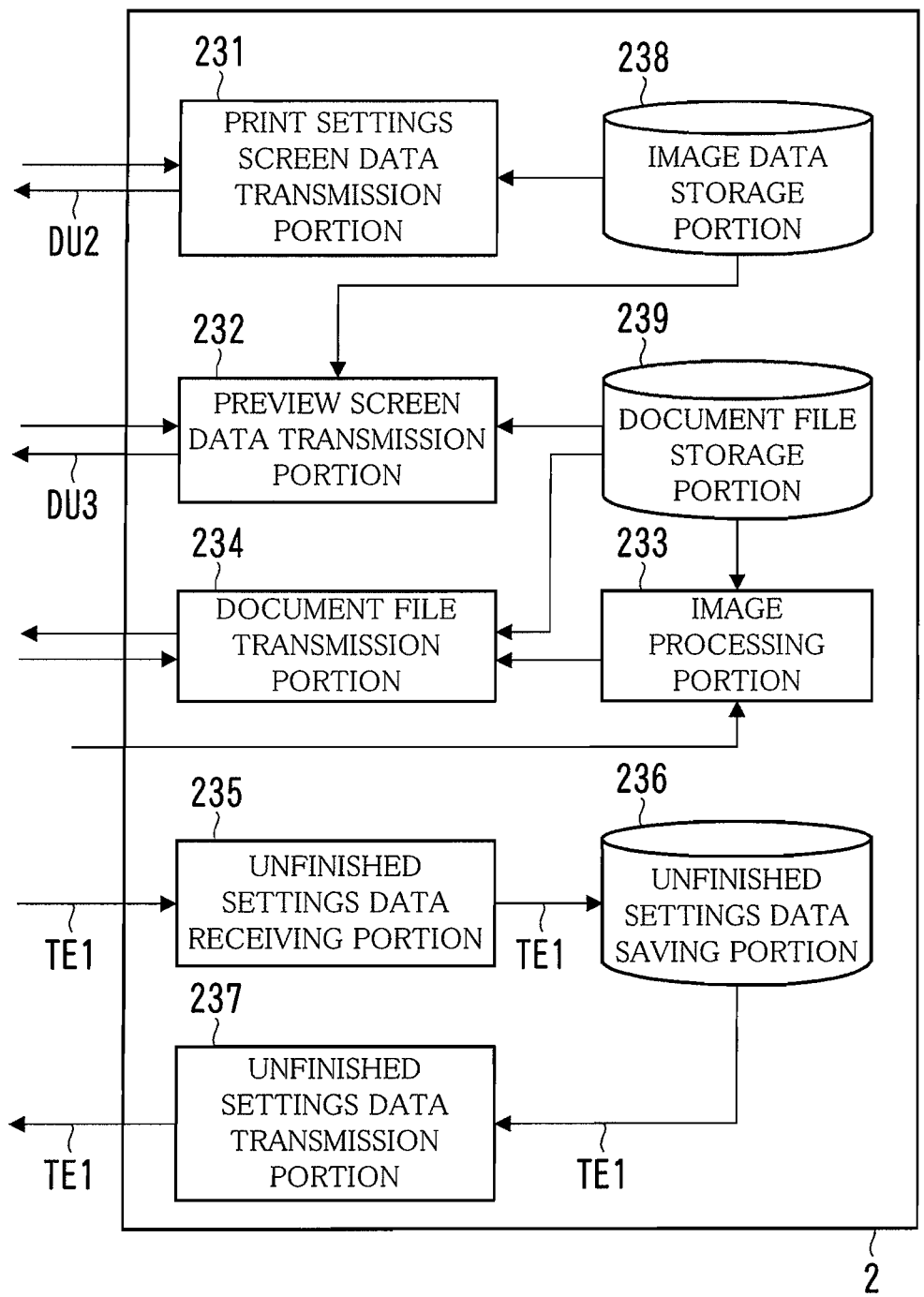
FIG. 15 is a diagram illustrating an example of the functional configuration of an application server according to the second embodiment.

FIG. 14 is a diagram illustrating an example of the functional configuration of an image forming apparatus 1 according to the second embodiment, and FIG. 15 is a diagram illustrating an example of the functional configuration of an application server 2 according to the second embodiment.

In the second embodiment, the image forming apparatus 1 and the application server 2 deal with a print job, while the image forming apparatus 1 and the application server 2 according to the first embodiment deal with a scan job. The following is a description of a case where a print job is dealt with. Description of points common to the case of dealing with a scan job shall be omitted.

The overall configuration of a network system NS of the second embodiment is the same as that of the first embodiment, and is the same as that shown in FIG. 1.

The hardware configuration of the image forming apparatus 1 of the second embodiment is the same as that of the first embodiment, and is the same as that shown in FIG. 2. Referring to FIG. 14, a ROM 10c or a hard disk 10d of the image forming apparatus 1 stores programs and data for implementing functions of a user authentication portion 131, a print settings screen data obtaining portion 132, a print settings screen display processing portion 133, a print control portion 134, a preview screen data obtaining portion 135, a preview screen display processing portion 136, an image processing requesting portion 137, a document file obtaining portion 138, an unfinished settings data transmission portion 141, a log-out process portion 142, an unfinished settings data obtaining portion 143, and the like.

The hardware configuration of the application server 2 of the second embodiment is the same as that of the first embodiment, and is the same as that shown in FIG. 4. Referring to FIG. 15, a ROM 20c or a hard disk 20d of the application server 2 stores programs and data for implementing functions of a print settings screen data transmission portion 231, a preview screen data transmission portion 232, an image processing portion 233, a document file transmission portion 234, an unfinished settings data receiving portion 235, an unfinished settings data saving portion 236, an unfinished settings data transmission portion 237, an image data storage portion 238, a document file storage portion 239, and the like.

A user operates the image forming apparatus 1 to cause the same to execute a print job, so that a printed matter of a document image can be obtained. Further, even when the user temporarily stops the operation of the image forming apparatus 1, he/she can resume the operation from a point at which the user has suspended the operation instead of starting the operation again from the beginning.

[Case where Setting Operations are not Interrupted]

Figure 17:
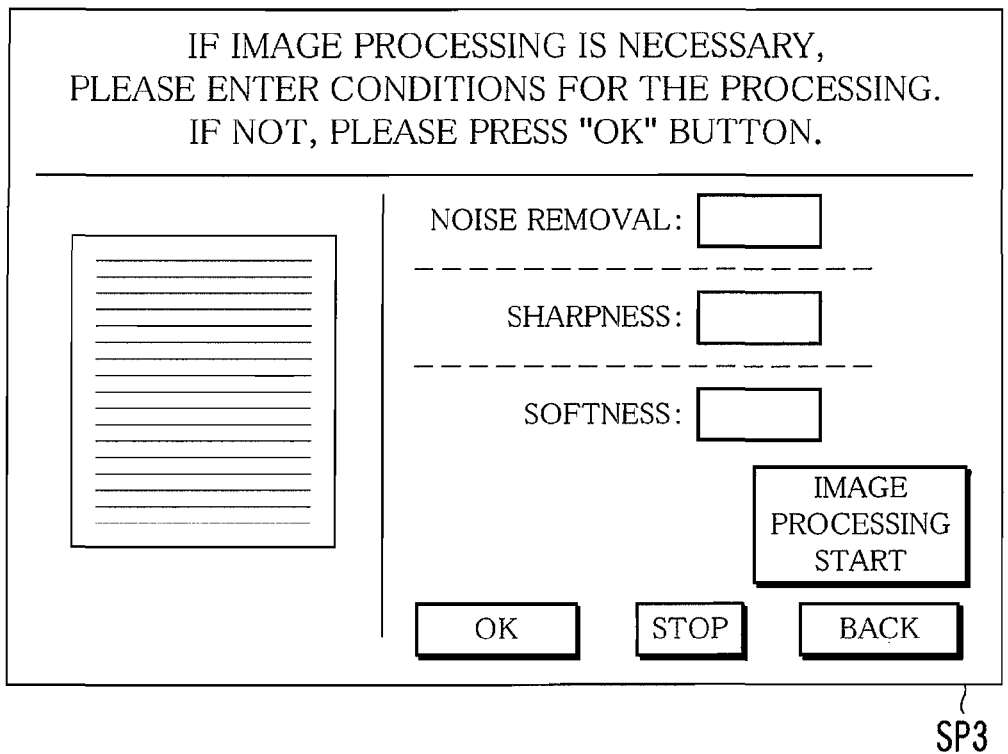
FIG. 17 is a diagram illustrating an example of a preview screen.

FIG. 16 is a diagram illustrating an example of a print settings screen SP2, and FIG. 17 is a diagram illustrating an example of a preview screen SP3.

Referring to FIG. 15, the image data storage portion 238 of the application server 2 stores, therein, in advance, data for displaying the screens described later, e.g., print settings screen data DU2. As with the first embodiment, each piece of the data is described in a format corresponding to the Web browser for example, and the data sometimes includes image data.

The document file storage portion 239 stores, therein, in advance, document files for reproducing document images. Formats of the document files are, for example, a Portable Document Format (PDF), and a Tagged Image File Format (TIFF).

Referring to FIG. 14, the user authentication portion 131 of the image forming apparatus 1 performs a user authentication process, as with the user authentication portion 101 (see FIG. 3) of the first embodiment. If the user is authenticated, then he/she is allowed to log onto the image forming apparatus 1 and to use the same. After the user logs onto the image forming apparatus 1, the job selection screen SC1 as shown in FIG. 7 is displayed on the operational panel 10e, as with the first embodiment. The user presses a "PULL PRINTING" button on the job selection screen SC1.

In response to the "PULL PRINTING" button being pressed, the print settings screen data obtaining portion 132 obtains the print settings screen data DU2 for displaying the print settings screen SP2 shown in FIG. 16 from the application server 2 in the following manner.

The print settings screen data obtaining portion 132 accesses the application server 2, and requests the print settings screen data DU2 from the application server 2.

Upon receiving the request, the print settings screen data transmission portion 231 of the application server 2 sends the print settings screen data DU2 to the image forming apparatus 1.

Subsequently, the print settings screen data obtaining portion 132 obtains the print settings screen data DU2 sent from the application server 2.

The print settings screen display processing portion 133 displays the print settings screen SP2 on the operational panel 10*e* based on the print settings screen data DU2 obtained from the application server 2. As shown in FIG. 16, radio buttons with which conditions of various items for printing and finishing, a pull-down menu, and text boxes are provided on the print settings screen SP2.

An item of "FINISH" indicates a condition for finishing to be applied to a printed matter of a document image. To be specific, the user can determine whether a printed matter is to be stapled or punched. An item of "SURFACE TO BE PRINTED" indicates a condition for determining which surface of paper a document image is to be printed onto. To be more specific, the user can determine, in the "SURFACE TO BE PRINTED" item, whether a document image is to be printed on one surface or both surfaces of paper.

An item of "PAPER SIZE" indicates a condition for determining the size of paper to be used for printing. An item of "COLOR" indicates a condition for color. To be specific, the user can determine, in the "COLOR" item, whether a document image is to be printed in color or monochrome. An item of "SET OF PRINTS" indicates a print quantity of a document.

An item of "FILE NAME" indicates a file name of a document file for reproducing a document image to be printed. Pressing a pull-down menu of the "FILE NAME" item displays a list of file names of document files stored in the document file storage portion 239 of the application server 2. The user can select, from among the list, a file name of a desired document image to be printed.

The user enters conditions for printing and necessary finishing on the print settings screen SP2, and presses an "OK" button. Thereby, settings for printing and necessary finishing are made.

The preview screen data obtaining portion 135 obtains preview screen data DU3 for displaying the preview screen SP3 shown in FIG. 17 from the application server 2 in the following manner.

The preview screen data obtaining portion 135 accesses the application server 2, and requests the preview screen data DU3 therefrom. At this time, the preview screen data obtaining portion 135 sends, to the application server 2, the conditions specified on the print settings screen SP2.

Responding to the request, the preview screen data transmission portion 232 of the application server 2 generates preview screen data DU3 and sends the generated preview screen data DU3 to the image forming apparatus 1. Referring to FIG. 17, the preview screen SP3 is formed of an image part corresponding to a printed matter obtained by printing the document image, and a part including text boxes for image processing settings described later and a variety of buttons. Data for displaying the former part is generated based on the document file that is stored in the document file storage portion 239 and corresponds to the file name informed by the image forming apparatus 1. Data for displaying the latter part is preview screen data prepared in the image data storage portion 208.

The preview screen data obtaining portion 135 obtains the preview screen data DU3 sent from the application server 2.

The preview screen display processing portion 136 displays the preview screen SP3 on the operational panel 10*e* based on the preview screen data DU3 obtained from the application server.

The user looks at the preview screen SP3 displayed, and confirms whether or not the document image is to be printed out in accordance with the conditions desired by him/her. If there is a problem with the document image, the application server 2 is caused to perform image processing, and thereby, corrections can be made to the document image. If there is no problem, then the user presses an "OK" button.

For example, if the document image contains a region including undesirable noise, then the user touches the region and enters sensitivity for detecting the noise into a "NOISE REMOVAL" text box. Alternatively, if the boundary between one color and the adjacent color in the document image is to be made sharp, then the user enters a desired value for increasing the sharpness into a "SHARPNESS" text box. Yet alternatively, if the boundary between one color and the adjacent color in the document image is to be blurred, then the user enters a desired value for reducing the sharpness into a "SOFTNESS" text box. In this way, the user sets the image processing conditions.

After completely specifying (entering) the image processing conditions, the user presses an "IMAGE PROCESSING START" button.

The image processing requesting portion 137 requests the application server 2 to perform the image processing on the document image in accordance with the conditions specified by the user on the preview screen SP3. At this time, the image processing requesting portion 137 conveys the conditions specified by the user to the application server 2.

With the application server 2, the image processing portion 233 receives the request from the image forming apparatus 1 and performs the image processing on the document image in accordance with the conditions received from the image forming apparatus 1. To be specific, the image processing portion 233 retrieves a document file corresponding to the document image from the document file storage portion 239, and updates the document file based on the received conditions.

The preview screen data transmission portion 232 uses a document file resulting from the update operation to generate new preview screen data DU3, and sends the new preview screen data DU3 to the image forming apparatus 1.

With the image forming apparatus 1, the preview screen display processing portion 136 displays the preview screen SC3 based on the new preview screen data DU3 sent from the application server 2.

In this manner, the user operates the image forming apparatus 1 to make corrections to the document image. If appropriate corrections have been made to the document image, then the user presses the "OK" button.

In response to the "OK" button being pressed on the preview screen SC3, the document file obtaining portion 138 obtains a document file from the application server 2 in the following manner.

The document file obtaining portion 138 accesses the application server 2, and requests a document file of the document image to be printed from the application server 2.

Upon receiving the request, the document file transmission portion 234 of the application server 2 sends the document file of the document to the image forming apparatus 1. Note that, if the document file has been updated in response to the request from the image forming apparatus 1, the document file transmission portion 234 sends the document file resulting from the update to the image forming apparatus 1.

Subsequently, the document file obtaining portion 138 obtains the document file sent from the application server 2.

The print control portion 134 uses the obtained document file to generate bitmap data of the document, and controls the printer unit 10*f* to print a document image of the document onto paper.

[Case where Setting Operations are Interrupted]

FIG. 18 is a diagram illustrating an example of a print settings screen SP2.

As with the first embodiment, a user can stop work temporarily, and resume the work again later. Alternatively, the user can resume the work again by using another image forming apparatus 1.

Descriptions are provided below of processes performed by the individual portions of the image forming apparatus 1 shown in FIG. 14 and the application server 2 shown in FIG. 15, taking an example in which a user Ux uses the image forming apparatus 1A to start work, stops the work temporarily before the work is completely performed, and resumes the work again by using the image forming apparatus 1B. Descriptions of processes and operation that are the same as those in the case where operations are not interrupted are omitted because the descriptions are already provided earlier.

As with the case where operations are not interrupted, the user Ux enters conditions for printing and necessary finishing on the print settings screen SP2 (see FIG. 16). The user Ux further enters image processing conditions, if necessary, on the preview screen SP3 (see FIG. 17).

If the user Ux is forced to stop the work temporarily before completely entering the conditions, then he/she presses a "STOP" button on the print settings screen SP2 or the preview screen SP3.

With the image forming apparatus 1A, the unfinished settings data transmission portion 141 generates unfinished settings data TE1 indicating a variety of conditions, the user ID of the user Ux, and a job ID of a job to be executed this time, all of which are entered during a period from when the user Ux logs onto the image forming apparatus 1A to when the user Ux presses the "STOP" button. A part of the unfinished settings data TE1 corresponding to the conditions is encrypted. The unfinished settings data transmission portion 141, then, sends the unfinished settings data TE1 to the application server 2.

With the application server 2, the unfinished settings data receiving portion 235 receives the unfinished settings data TE1 from the image forming apparatus 1A. The unfinished settings data saving portion 236 saves, thereto, the unfinished settings data TE1 received.

With the image forming apparatus 1A, if the user presses the "STOP" button, then the log-out process portion 142 lets the user Ux log out from the image forming apparatus 1A, and displays, on the operational panel 10e, the job ID of the job for which the settings have not yet been completed.

The user Ux memorizes the job ID displayed on the operational panel 10e, and goes to the site of the image forming apparatus 1B. The user Ux, then, enters his/her user ID and password into the image forming apparatus 1B and logs thereonto.

With the image forming apparatus 1B, a user authentication portion 131 performs an authentication process on the user Ux based on the user ID and password entered by the user Ux and the database, and allows the user Ux to log onto the image forming apparatus 1B. A print settings screen data obtaining portion 132 receives the print settings screen data DU2 from the application server 2, and a print settings screen display processing portion 133 displays the print settings screen SP2.

The user Ux enters the job ID displayed on the operational panel 10e of the image forming apparatus 1A in the "JOB ID" text box on the print settings screen SP2, and presses a "RETRIEVE" button.

In response to the "RETRIEVE" button being pressed, the unfinished settings data obtaining portion 143 obtains the unfinished settings data TE1 from the application server 2 as follows.

The unfinished settings data obtaining portion 143 accesses the application server 2, and requests the unfinished settings data TE1 therefrom. At this time, the unfinished settings data obtaining portion 143 informs the application server 2 of the user ID of the user Ux and the job ID entered by the user Ux.

Upon receiving the request, the unfinished settings data transmission portion 237 of the application server 2 searches in the unfinished settings data saving portion 236 for unfinished settings data TE1 containing the user ID and job ID received from the unfinished settings data obtaining portion 143 of the image forming apparatus 1B. The unfinished settings data transmission portion 237, then, sends the unfinished settings data TE1 found by the search to the image forming apparatus 1B.

The unfinished settings data obtaining portion 143 obtains the unfinished settings data TE1 sent from the application server 2, and decrypts the encrypted part of the unfinished settings data TE1.

The print settings screen display processing portion 133 displays the print settings screen SP2 as shown in FIG. 18 in such a manner that the setting details indicated in the obtained unfinished settings data TE1 are reflected, i.e., that radio buttons are selected in accordance with the setting details.

After the unfinished settings data TE1 is obtained, the preview screen display processing portion 136 displays the preview screen SP3 with the setting details of the unfinished settings data TE1 reflected.

Thereafter, the individual portions of the image forming apparatus 1 and the application server 2 perform image processing on the document image, if necessary, in accordance with the conditions modified appropriately, i.e., the latest conditions specified by the user Ux; thereby to print out the document image.

Figure 19:
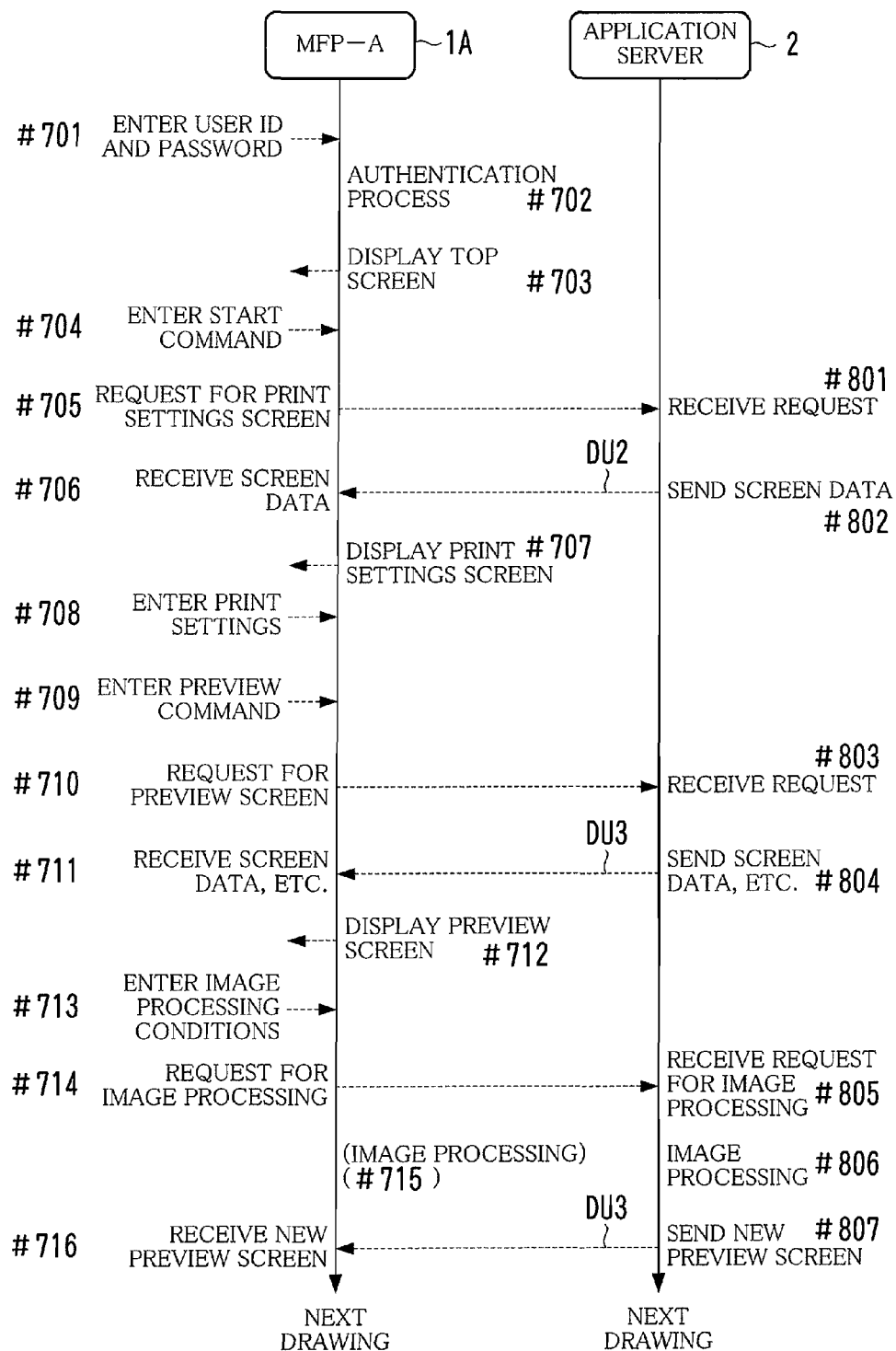
FIG. 19 is a flowchart depicting an example of the overall processing flow of an image forming apparatus and an application server according to the second embodiment.
Figure 20:
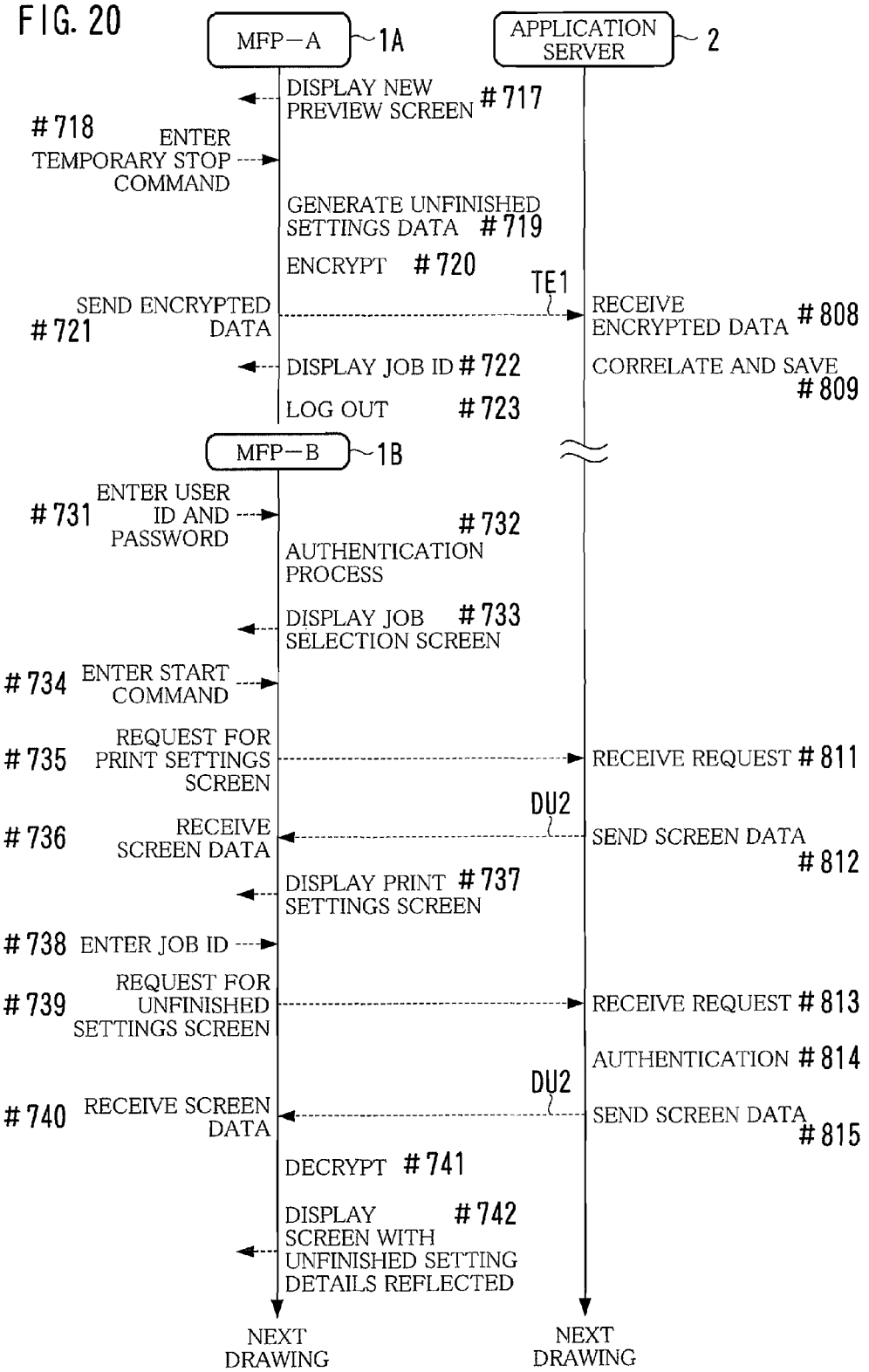
FIG. 20 is a flowchart depicting an example of the overall processing flow of image forming apparatuses and an application server according to the second embodiment.
Figure 21:
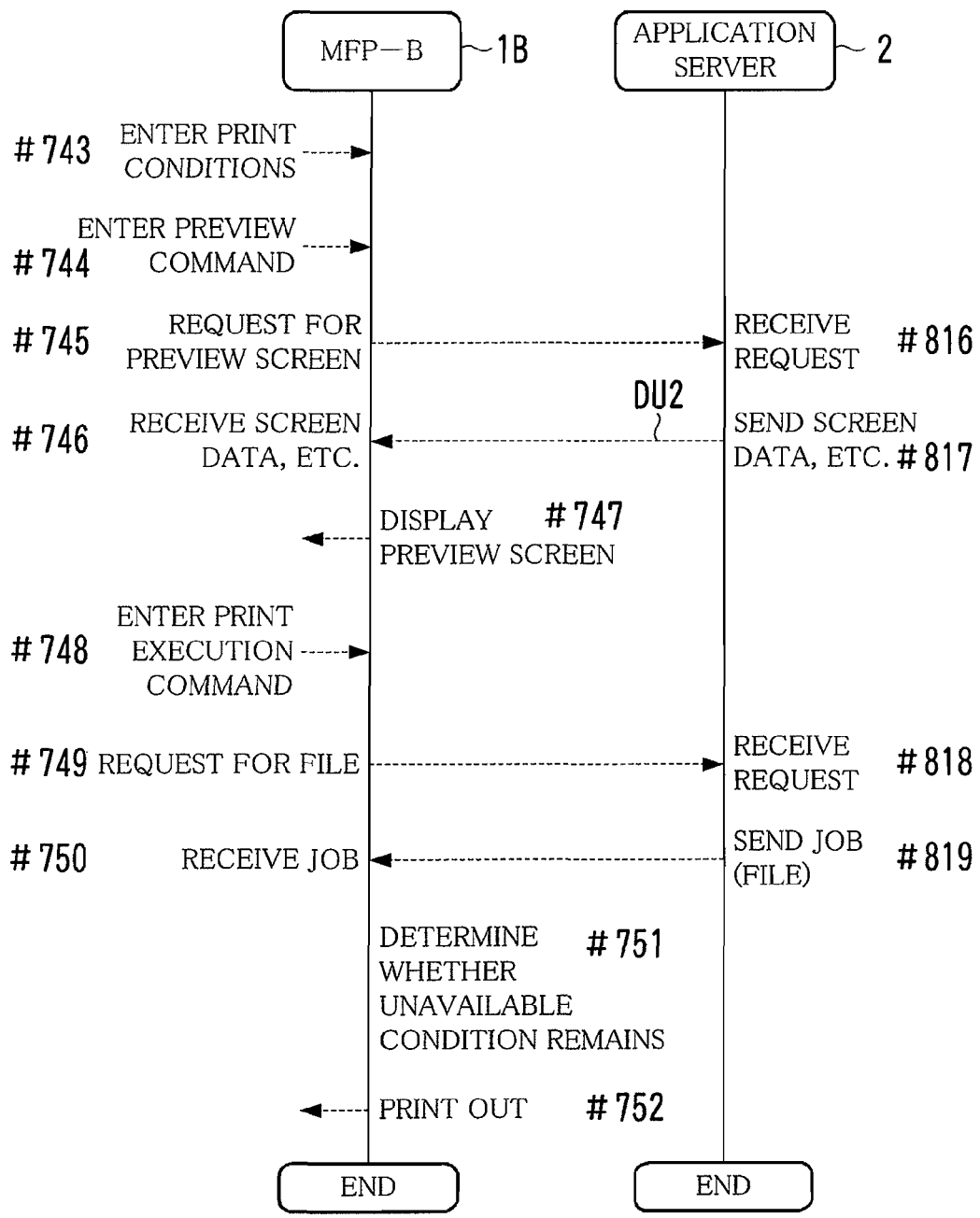
FIG. 21 is a flowchart depicting an example of the overall processing flow of an image forming apparatus and an application server according to the second embodiment.

FIGS. 19-21 are flowcharts depicting an example of the overall processing flow of the image forming apparatuses 1A and 1B and the application server 2 according to the second embodiment.

Descriptions are provided below, with reference to the flowcharts of FIGS. 19-21, of the overall processing flow of the image forming apparatuses 1A and 1B and the application server 2, taking an example in which the user Ux uses the image forming apparatus 1A and the image forming apparatus 1B to perform pull printing of a document managed by the application server 2.

A process for the user Ux to log onto the image forming apparatus 1A (Steps #701-#703 of FIG. 19) is the same as that of Steps #501-503 of FIG. 12 described earlier; therefore the description thereof is omitted.

When the user Ux presses the "PULL PRINTING" button on the job selection screen SC1 to give a command to start the pull printing function (#704), the image forming apparatus 1A requests print settings screen data DU2 from the application server 2 (#705).

Upon receiving the request (#801), the application server 2 sends the print settings screen data DU2 to the image forming apparatus 1A (#802).

When receiving the print settings screen data DU2 (#706), the image forming apparatus 1A displays the print settings screen SP2 (see FIG. 16) (#707).

The user Ux enters conditions for pull printing on the print settings screen SP2 (#708), and presses the "OK" button; thereby to give a command to display a preview image (#709).

Responding to the command, the image forming apparatus 1A requests, from the application server 2, a preview image of the document image to be printed based on the entered conditions (#710). At this time, the image forming apparatus 1A sends the entered conditions to the application server 2.

Upon receiving the request (#803), the application server 2 uses a document file of a document indicated in the conditions received from the image forming apparatus 1A to generate preview screen data DU3 indicating a preview image of the document to be printed out based on the conditions received, and sends the generated preview screen data DU3 to the image forming apparatus 1A (#804).

The image forming apparatus 1A receives the preview screen data DU3 (#711) and displays the preview screen SP3 (see FIG. 17) (#712).

The user Ux views the preview screen SP3 and confirms whether or not the document is to be printed out according to his/her desire. The user Ux, then, enters conditions for image processing to be performed by the application server 2 if necessary, and presses an "IMAGE PROCESSING START" button (#713).

When the user Ux enters the conditions completely, the image forming apparatus 1A requests the application server 2 to perform the image processing (#714). At this time, the image forming apparatus 1A conveys the entered conditions to the application server 2.

When receiving the request (#805), the application server 2 retrieves a document file of a document indicated in the received conditions, and performs image processing on the document image of the document in accordance with the conditions received from the image forming apparatus 1A (#806). This updates the retrieved document file. The application server 2, then, generates new preview screen data DU3 indicating the document image that has undergone the image processing and sends the new preview screen data DU3 to the image forming apparatus 1A (#807).

If the image forming apparatus 1A itself is capable of performing the image processing based on the conditions, then it is possible for the image forming apparatus 1A rather than the application server 2 to perform the image processing (#715).

Upon receiving the new preview screen data DU3 (#716), the image forming apparatus 1A displays, based on the received new preview screen data DU3, the preview screen SP3 in which the document image that has undergone the image processing is reflected (#717 of FIG. 20).

If the user Ux intends to perform further image processing on the document image, then the user Ux preferably specifies conditions again on the preview screen SP3. Alternatively, in order to change the conditions for printing and finishing, the user Ux preferably presses a "BACK" button to display the print settings screen SP2 again. When the "BACK" button is pressed, the image forming apparatus 1A displays again the print settings screen SP2 in such a manner that the conditions specified the last time are reflected.

Suppose that, although the user Ux intends to use the image forming apparatus 1A to change the conditions for printing and finishing, another user comes to the site of the image forming apparatus 1A, and asks the user Ux to let him/her use the image forming apparatus 1A. Suppose further that the user Ux has decided to use the image forming apparatus 1B to continue the remaining part of the work for changing the conditions.

When the user Ux presses the "STOP" button (#718), the image forming apparatus 1A generates (#719) unfinished settings data TE1 indicating a variety of conditions, the user ID of the user Ux, and a job ID of a job to be executed this time, all of which are entered during a period from when the user Ux logs onto the image forming apparatus 1A to when the user Ux presses the "STOP" button. The image forming apparatus 1A further encrypts a part corresponding to the conditions of the unfinished settings data TE1 (#720). The image forming apparatus 1A then sends, to the application server 2, the unfinished settings data TE1 with the part encrypted (#721).

The image forming apparatus 1A displays the job ID of the job to be executed this time (#722) in parallel with the process for generating and sending the unfinished settings data TE1 or before or after that process. The image forming apparatus 1A lets the user UX log out therefrom (#723).

When receiving the unfinished settings data TE1 (#808), the application server 2 saves the unfinished settings data TE1 as-is, more specifically, saves the unfinished settings data TE1 with the conditions correlated with the user ID and the job ID (#809).

The user Ux memorizes the displayed job ID and goes to the site of the image forming apparatus 1B. The user Ux, then, enters his/her user ID and password into the image forming apparatus 1B (#731).

Responding to this operation, the image forming apparatus 1B performs an authentication process on the user Ux (#732). If it is verified that the user Ux is an authorized user, then the image forming apparatus 1B allows the user Ux to log thereonto, and displays the job selection screen SC1 (FIG. 7) (#733).

When the user Ux presses the "PULL PRINTING" button to give a command to start the pull printing function (#734), the image forming apparatus 1B requests print settings screen data DU2 from the application server 2 (#735).

Upon receiving the request (#811), the application server 2 sends the print settings screen data DU2 to the image forming apparatus 1B (#812).

When receiving the print settings screen data DU2 (#736), the image forming apparatus 1B displays the print settings screen SP2 (#737).

The user Ux, then, enters the job ID displayed by the image forming apparatus 1A into the image forming apparatus 1B (#738).

The image forming apparatus 1B, then, requests unfinished settings data TE1 from the application server 2 (#739). At this time, the image forming apparatus 1B conveys the user ID of the user Ux and the entered job ID to the application server 2.

When receiving the request (#813), the application server 2 performs an authentication process based on the user ID and the job ID received (#814). The application server 2 determines that the request is allowable if the unfinished settings data TE1 indicating the user ID and the job ID received is found, and therefore, sends the unfinished settings data TE1 thus found to the image forming apparatus 1B (#815).

Upon receiving the unfinished settings data TE1 (#740), the image forming apparatus 1B decrypts the encrypted part (#741). The image forming apparatus 1B, then, displays again the print settings screen SP2 with the setting details of the unfinished settings data TE1 reflected as shown in FIG. 18 (#742). Note that, when the preview screen SP3 is displayed later, the setting details of the unfinished settings data TE1 are reflected therein.

Thereby, the user Ux can use the image forming apparatus 1B to continue the remaining part of the work again which has been performed using the image forming apparatus 1A.

When the user Ux uses the image forming apparatus 1B to resume the work again, specifies printing conditions and so on again, enters the conditions, and presses the "OK" button (#743 and #744 of FIG. 21), the image forming apparatus 1B performs the same processes as those shown in Steps #710-#712 performed by the image forming apparatus 1A; thereby to display the preview screen SP3 (#745-#747). At this time, the application server 2 performs the same processes as those shown in Steps #803 and #804, generates preview screen data DU3, and provides the image forming apparatus 1B with the preview screen data DU3 (#816 and #817).

If the user Ux determines that the document is to be printed according to his/her desire, then he/she presses the "OK" button to give a command to execute a printing process (#748).

Responding to the command, the image forming apparatus 1B requests, from the application server 2, a document file of the document image to be printed, and obtains the document file therefrom (#749 and #750). At this time, the application server 2 sends the document file to the image forming apparatus 1B in accordance with the request (#818 and #819).

The image forming apparatus 1B uses the document file received to print out the document image onto paper in accordance with the entered conditions, and to apply necessary finishing to the printed matter (#752).

In some cases, conditions remain unapplied based on which the image forming apparatus 1A can apply finishing to the printed matter but the image forming apparatus 1B cannot. For example, such a case corresponds to a case where stapling has been specified as one of finishing conditions in the image forming apparatus 1A; however the image forming apparatus 1B is not equipped with a stapling function. To cope with this, the following configuration is possible. Before starting to print in Step #752, it is checked whether or not such a condition is specified. If such a condition is found by the check, then the user Ux may be informed of the condition by displaying the condition or the like (#751). Then, when the user Ux gives again a print command, the condition may be unspecified for printing.

According to the first and second embodiments, a user can use a second image forming apparatus 1 to retrieve unfinished settings data TD1 or TE1 indicating conditions a part of which has been specified by using a first image forming apparatus 1, and use the second image forming apparatus 1 to continue the remaining part of the work for specifying the conditions. This improves the convenience of a user who makes settings for processing conditions.

In the second embodiment, the user specifies only a file name of a document file to be used; however, the user may specify a saving location of the document file. This enables the user to specify document files saved in different saving locations. In addition, the user may specify the type of image processing to be performed. In the case where the user specifies a saving location or the like in addition to a file name, a Uniform Resource Locator (URL) is preferably used.

The first and second embodiments are applicable also to a case where a user temporarily stops work performed by using an image forming apparatus 1 and resumes the work again by using the same image forming apparatus 1 as used the last time.

Modification

Figure 22:
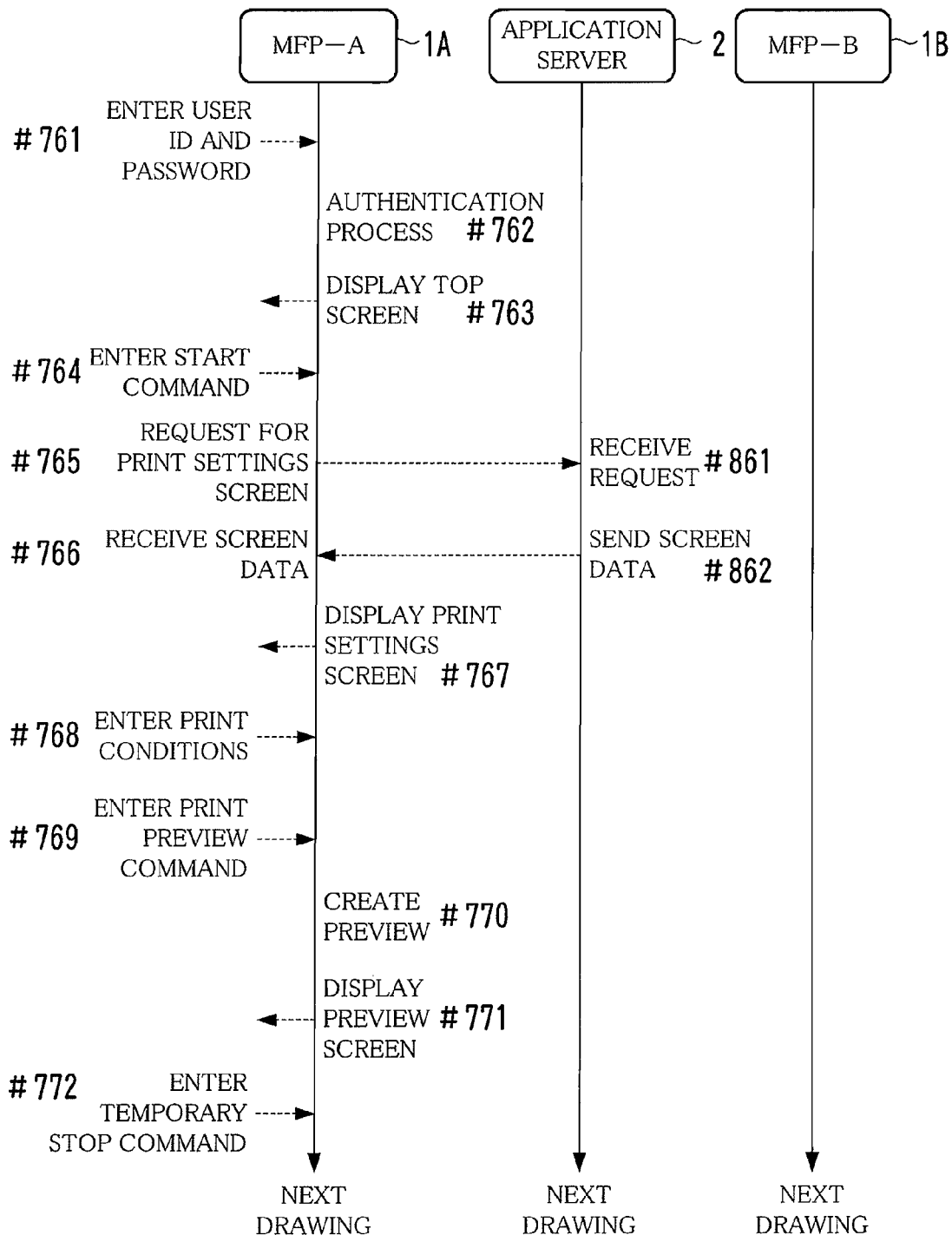
FIG. 22 is a flowchart depicting a variation of the overall processing flow of image forming apparatuses and an application server.
Figure 23:
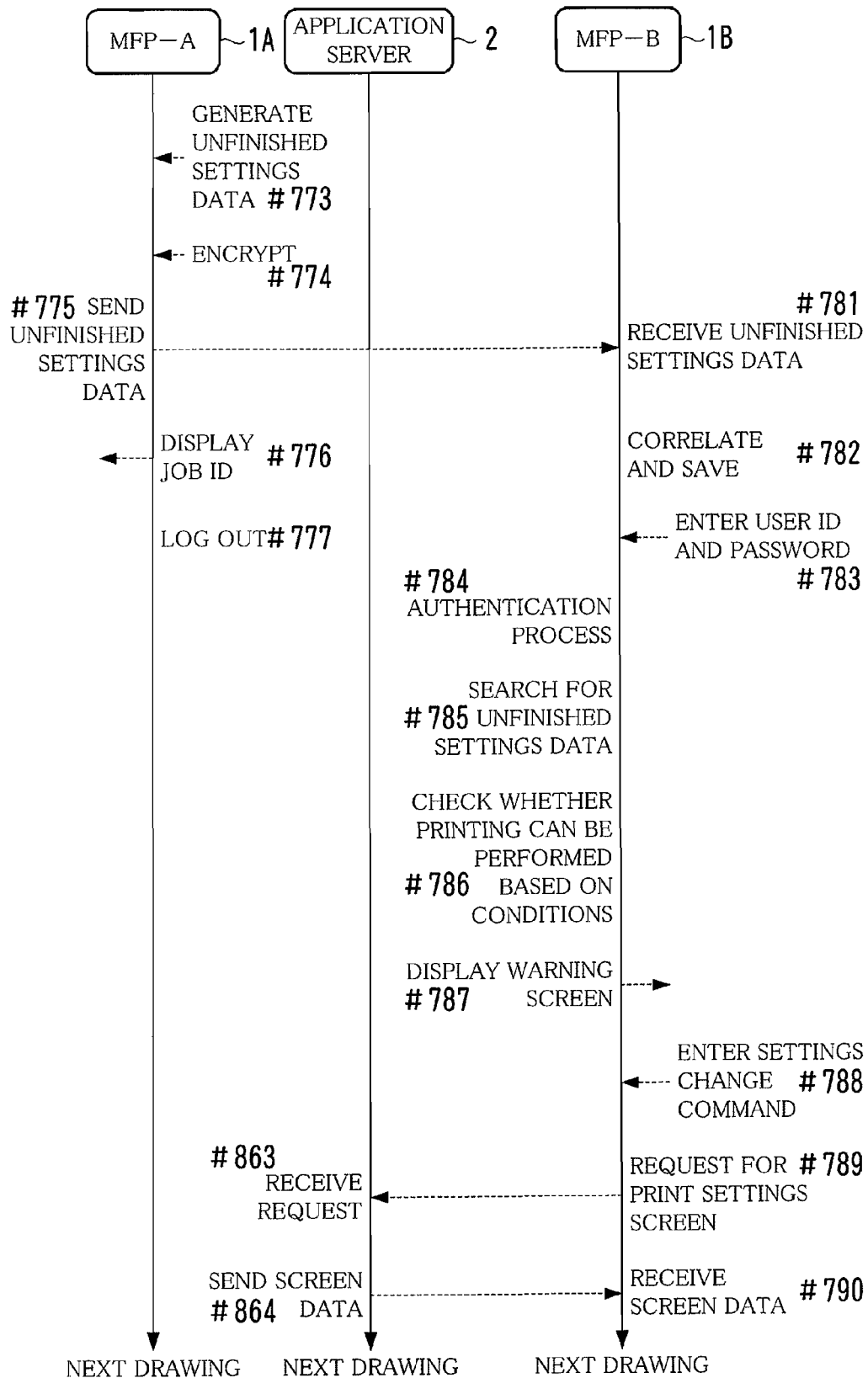
FIG. 23 is a flowchart depicting a variation of the overall processing flow of image forming apparatuses and an application server.
Figure 24:
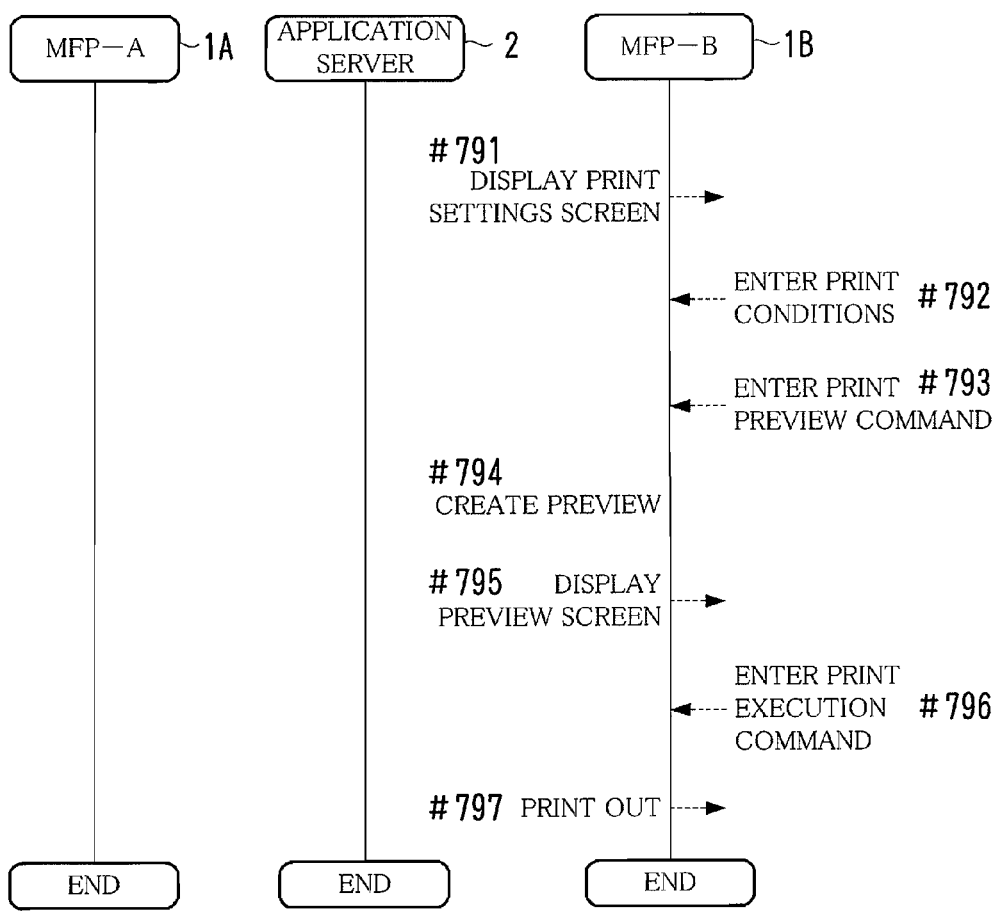
FIG. 24 is a flowchart depicting a variation of the overall processing flow of image forming apparatuses and an application server.

FIGS. 22-24 are flowcharts depicting a variation of the overall processing flow of the image forming apparatuses 1A and 1B, and the application server 2.

In the first and second embodiments, unfinished settings data TD1 or TE1 is provided from a first image forming apparatus 1 to a second image forming apparatus 1 through the application server 2 in order to enable a user to temporarily stop work performed using the first image forming apparatus 1 and to continue the remaining part of the work using the second image forming apparatus 1. Instead, however, another configuration is possible in which the unfinished settings data TD1 or TE1 is provided from the first image forming apparatus 1 to the second image forming apparatus 1 and vice versa without the application server 2.

In the first and second embodiments, the application server 2 provides the image forming apparatus 1 with preview image data. Instead, the image forming apparatus 1 may create preview image data by itself.

In the second embodiment, the image forming apparatus 1 performs printing by using a document file managed in the application server 2. Instead, it is possible for the image forming apparatus 1 to perform printing by using a document file stored in a box thereof.

Descriptions are provided below, with reference to the flowcharts of FIGS. 22-24, of a modified example of the second embodiment which involves dealing with the unfinished settings data TE1 and image data, taking an example in which printing is performed using a document file saved in a box.

Basically, a process for the user Ux to log onto the image forming apparatus 1A (Steps #761-#763 of FIG. 22) and a process for displaying the print settings screen SP2 (see FIG. 16) (Steps #764-#767, and #861-#862) are respectively the same as that of Steps #701-703 of FIG. 19 in the second embodiment, as that of Steps #704-#707 thereof, and as that of Steps #801-#801 thereof. However, the modification differs from the second embodiment in that pressing a pull-down menu of the "FILE NAME" of the print settings screen SP2 displays a list of file names of document files stored in a box of the user Ux.

The user Ux enters, for example, printing conditions on the print settings screen SP2 (#768), and presses the "OK" button; thereby to give a command to display a preview image (#769).

Responding to the command, the image forming apparatus 1A retrieves a document file from the box based on the entered conditions, generates preview screen data DU3 (#770), and displays the preview screen SP3 shown in FIG. 17 (#771).

The user enters, on the preview screen SP3, conditions for image processing to be performed by the application server 2. However, the user Ux is forced to temporarily stop the work before completing the work, and presses the "STOP" button. At this time, the user Ux specifies an image forming apparatus 1 with which the user Ux resumes the work again later.

When the user Ux presses the "STOP" button (#772), the image forming apparatus 1A generates (#773) unfinished settings data TF1 indicating the variety of conditions, the user ID of the user Ux, and a job ID of a job to be executed this time, all of which are entered during a period from when the user Ux logs onto the image forming apparatus 1A to when the user Ux presses the "STOP" button. The image forming apparatus 1A further encrypts a part corresponding to the conditions of the unfinished settings data TF1 (#774). The image forming apparatus 1A then sends, to the image forming apparatus 1 specified by the user, i.e., the image forming apparatus 1B in this example, the unfinished settings data TF1 with the part encrypted (#775).

The image forming apparatus 1A displays the job ID of the job to be executed this time (#776) in parallel with the process for generating and sending the unfinished settings data TF1 or before or after that process. The image forming apparatus 1A lets the user UX log out therefrom (#777).

When receiving the unfinished settings data TF1 (#781), the image forming apparatus 1B saves the unfinished settings data TF1 as-is, more specifically, saves the unfinished settings data TF1 with the conditions correlated with the user ID and the job ID (#782).

The user Ux memorizes the displayed job ID, and goes to the site of the image forming apparatus 1B. The user Ux, then, enters his/her user ID and password into the image forming apparatus 1B (#783).

Responding to this operation, the image forming apparatus 1B performs an authentication process on the user Ux (#784). If it is verified that the user Ux is an authorized user, then the image forming apparatus 1B allows the user Ux to log thereonto. The image forming apparatus 1B further searches for unfinished settings data TF1 containing the entered user ID and job ID (#785). If the unfinished settings data TF1 is found by the search, then the image forming apparatus 1B checks whether or not printing can be performed in accordance with the conditions specified in the found unfinished settings data TF1 (#786). If it is determined that printing cannot be performed in accordance with the conditions, then the image forming apparatus 1B displays a warning message indicating the fact (#787).

The user Ux enters a command to change the settings (#788) to display the print settings screen SP2, so that he/she can specify again the printing conditions and so on. The print settings screen SP2 is displayed in such a manner that the conditions indicated in the unfinished settings data TF1 are reflected. A process for displaying the print settings screen SP2 (Steps #789 of FIG. 23 through #791 of FIG. 24, and Steps #863 and #864 of FIG. 23) is the same as that described earlier.

The user Ux can also cause the image forming apparatus 1B to display the preview screen SP3 as with the case of the image forming apparatus 1A. The steps of this process (Steps #792-#795) are the same as those described earlier.

When receiving a command to execute a printing process (#796), the image forming apparatus 1B prints the document image onto paper based on the latest conditions (#797).

The image forming apparatus 1A may inform the user Ux of image forming apparatuses 1 capable of performing a printing process and applying finishing to a printed matter based on the conditions indicated in the unfinished settings data TF1. The image forming apparatus 1A, then, may send the unfinished settings data TF1 to one of the image forming apparatuses 1 selected by the user Ux. The image forming apparatus 1A preferably makes a confirmation by inquiring the individual image forming apparatuses 1 whether or not printing and applying finishing can be performed therein based on the conditions indicated in the unfinished settings data TF1. Alternatively, it is possible to store, in advance, information indicating the specifications of the individual image forming apparatuses 1 into the application server 2, to download the information therefrom, and to make the confirmation based on the information.

The first and second embodiments and modification describe a case of dealing with a scan job and a pull printing job. The present invention is, however, applicable to a case of dealing with other types of jobs such as a fax transmission job.

In the embodiments discussed above, the overall configurations of the network system NS, the image forming apparatus 1, and the application server 2, the configurations of various portions thereof, the content to be processed, the processing order, the structure of the data, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
    a display portion that displays a condition input screen on which a user enters a condition for a process of printing or scanning an image;
    a control portion that, when a first operation is performed, transmits the condition thus entered to another image processing apparatus equipped with a function to execute the process of printing or scanning an image based on the condition;
    a storage portion that stores a condition that was input by the user at another image processing apparatus and transmitted from said another image processing apparatus;
    a retrieval portion that, if a second operation is performed, reads out the condition from the storage portion that was input by the user at said another image processing apparatus;
    a re-display portion that displays again the condition input screen in a state where the condition that was input by the user at said another image processing apparatus thus read out is entered; and
    a process execution portion that, if a third operation is performed, executes the process of printing or scanning an image based on a latest condition stored in the storage portion.

2. The image processing apparatus according to claim 1, wherein
    the storage portion is a storage medium provided in another image processing apparatus, and
    the control portion stores the condition in the storage portion by sending the condition to another image processing apparatus.

3. The image processing apparatus according to claim 1, further comprising an informing portion that, if another image processing apparatus stores, in the storage portion, the condition read out by the retrieval portion, and if the process of printing or scanning an image cannot be executed based on the condition, informs the user that the process of printing or scanning an image cannot be executed based on the condition.

4. An image processing method comprising:
    performing, in an image processing apparatus, a display process of displaying a condition input screen on which a user enters a condition for an input and output process of printing or scanning an image;
    when a first operation is performed, performing, in the image processing apparatus, a transmitting process of sending the condition thus entered to another image processing apparatus equipped with a function to execute the process of printing or scanning an image based on the condition, and a storage process of storing a condition in a storage portion that was input by the user at another image processing apparatus and transmitted from said another image processing apparatus;
    if a second operation is performed, performing, in the image processing apparatus, a retrieval process of reading out the condition from the storage portion that was input by the user at said another image processing apparatus;
    performing, in the image processing apparatus, a re-display process of displaying again the condition input screen in a state where the condition that was input by the user at said another image processing apparatus thus read out is entered; and if a third operation is performed, performing, in the image processing apparatus, the input and output process based on a latest condition stored in the storage portion.

5. An image processing method comprising:

performing, in a first image processing apparatus, a first display process of displaying a condition input screen on which a user enters a condition for an input and output process of printing or scanning an image;

when a first operation is performed, performing, in the first image processing apparatus, a transmission process of sending the condition thus entered to a second image processing apparatus equipped with a function to execute the process of printing or scanning an image based on the condition;

performing, in the second image processing apparatus, a reception process of receiving the condition from the first image processing apparatus that was input by said user at the first image processing apparatus;

if a second operation is performed, performing, in the second image processing apparatus, a second display process of displaying the condition input screen in a state where the condition that was input by the user at said first image processing apparatus thus received is entered; and if a third operation is performed, performing, in the second image processing apparatus, the input and output process based on a latest condition sent to the second image processing apparatus.

6. A non-transitory computer-readable storage medium storing thereon a computer program used in an image processing apparatus for performing an input and output process of printing or scanning an image, the computer program causing the image processing apparatus to perform:

a display process of displaying a condition input screen on which a user enters a condition for the input and output process;

when a first operation is performed, a transmitting process of sending the condition thus entered to another image processing apparatus equipped with a function to execute the process of printing or scanning an image based on the condition, and a storage process of storing a condition in a storage portion that was input by the user at another image processing apparatus and transmitted from said another image processing apparatus;

if a second operation is performed, a retrieval process of reading out a condition from the storage portion that was input by the user at said another image processing apparatus;

a re-display process of displaying again the condition input screen in a state where the condition that was input by the user at said another image processing apparatus thus read out is entered; and if a third operation is performed, the input and output process based on a latest condition stored in the storage portion.

7. A non-transitory computer-readable storage medium storing thereon a computer program used in an image processing apparatus for performing an input and output process of printing or scanning an image, wherein, if the image processing apparatus functions as a first image processing apparatus, the computer program causing the first image processing apparatus to perform a first display process of displaying a condition input screen on which a user enters a condition for the input and output process, and when a first operation is performed, a transmission process of sending the condition thus entered to another image processing apparatus equipped with a function to execute the process of printing or scanning an image based on the condition, wherein, if the image processing apparatus functions as a second image processing apparatus, the computer program causing the second image processing apparatus to perform a reception process of receiving the condition from said another image processing apparatus that was input by the user at said another image processing apparatus, if a second operation is performed, a second display process of displaying the condition input screen in a state where the condition that was input by the user at said another image processing apparatus thus received is entered, and if a third operation is performed, the input and output process based on a latest condition sent to said another image processing apparatus.

\* \* \* \* \*